United States Patent
Mori et al.

(10) Patent No.: US 10,522,032 B2
(45) Date of Patent: Dec. 31, 2019

(54) DRIVING-STATE DATA STORAGE APPARATUS

(71) Applicant: DENSO CORPORATION, Kariya, Aichi-pref. (JP)

(72) Inventors: Masataka Mori, Kariya (JP); Hideaki Misawa, Kariya (JP); Kazuhito Takenaka, Kariya (JP); Yuki Shinohara, Kariya (JP); Kentaro Hitomi, Kariya (JP); Utsushi Sakai, Kariya (JP); Masumi Egawa, Kariya (JP); Kenji Muto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/589,812

(22) Filed: May 8, 2017

(65) Prior Publication Data

US 2017/0337812 A1 Nov. 23, 2017

(30) Foreign Application Priority Data

May 9, 2016 (JP) .................................. 2016-093861
Nov. 10, 2016 (JP) .................................. 2016-219659

(51) Int. Cl.
*G08G 1/01* (2006.01)
*G06F 16/29* (2019.01)

(52) U.S. Cl.
CPC ........... *G08G 1/0133* (2013.01); *G06F 16/29* (2019.01); *G08G 1/0112* (2013.01); *G08G 1/0141* (2013.01)

(58) Field of Classification Search
None
See application file for complete search history.

(56) References Cited

U.S. PATENT DOCUMENTS

| 2007/0208495 A1* | 9/2007 | Chapman | G08G 1/0104 |
| | | | 701/117 |
| 2008/0059051 A1* | 3/2008 | Kumagai | G08G 1/0104 |
| | | | 701/117 |
| 2015/0228188 A1* | 8/2015 | Macfarlane | G08G 1/0129 |
| | | | 340/936 |

FOREIGN PATENT DOCUMENTS

| JP | 2006-024103 | 1/2006 |
| JP | 2007-156894 | 6/2007 |
| JP | 2011-186737 | 9/2011 |
| JP | 2012-123625 | 6/2012 |

(Continued)

*Primary Examiner* — Lail A Kleinman
(74) *Attorney, Agent, or Firm* — Knobbe, Martens, Olson & Bear, LLP

(57) ABSTRACT

In a driving-state data storage apparatus, a collector collects, from each of vehicles on a target travelling road, a value of data indicative of a driving state of the corresponding vehicle to correspondingly obtain driving-state data values for the target road. A data allocator divides, based on similarity among the driving-state data values, the target traveling road into a plurality of traveling segments, and extracts, from the driving-state data values, data values for each of the divided travelling segments. The data values extracted for each of the travelling segments are similar to each other. The data allocator allocates a distribution of the extracted data values for each of the divided travelling segments to the corresponding one of the divided travelling segments as a feature distribution. A storage unit stores the feature distribution allocated for each of the travelling segments.

10 Claims, 22 Drawing Sheets

(56) References Cited

FOREIGN PATENT DOCUMENTS

| | | |
|---|---|---|
| JP | 2013-250663 | 12/2013 |
| JP | 2014-235605 | 12/2014 |
| JP | 2016-006597 | 1/2016 |
| JP | 2016-099635 | 5/2016 |

\* cited by examiner

| TRAVELLING SEGMENT ID | RANGE | ADJACENT ID | CURRENT FEATURE DISTRO | DEFINITION TIME DISTRO | SIMILARITY CALCULATION FLAG | ID BEFORE DIVISION | ID BEFORE COMBINATION |
|---|---|---|---|---|---|---|---|
| i | $\{(long,lat)\}_i$ | $\{j\}_i$ | NULL | NULL | False | NULL | NULL |

| DRIVING INFORMATION ID | DRIVING-STATE DATA | SAMPLED POSITION | TRAVELLING SEGMENT ID |
|---|---|---|---|
| n | $d_n$ | $(long,lat)_n$ | NULL |

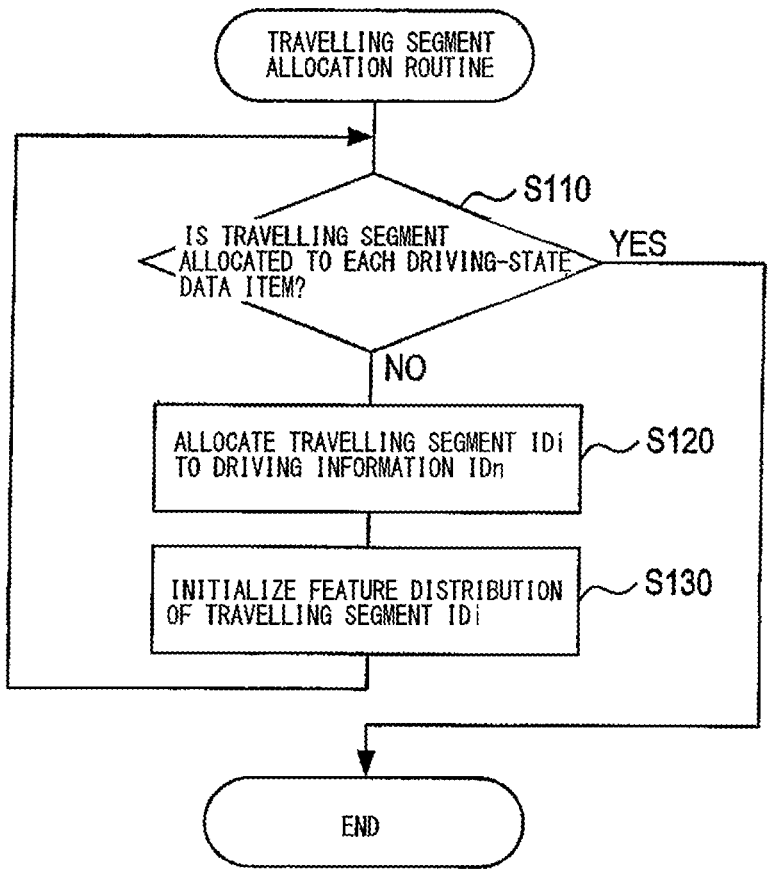

| TRAVELLING SEGMENT ID | RANGE | ADJACENT ID | CURRENT FEATURE DISTRO | DEFINITION TIME DISTRO | SIMILARITY CALCULATION FLAG | ID BEFORE DIVISION | ID BEFORE COMBINATION |
|---|---|---|---|---|---|---|---|
| i | {(long,lat)}$_i$ | {j}$_i$ | $P_i$ | $P_{i0}$ | True | NULL | NULL |

| TRAVELLING SEGMENT ID | TRAVELLING SEGMENT ID PAIR | DISTRO SIMILARITY |
|---|---|---|
| i | (i,j) | $S_a(P_i, P_j)$ |
| | (i,i) | $S_b(P_i, P_{i0})$ |

| TRAVELLING SEGMENT ID | RANGE | ADJACENT ID | CURRENT FEATURE DISTRO | DEFINITION TIME DISTRO | SIMILARITY CALCULATION FLAG | ID BEFORE DIVISION | ID BEFORE COMBINATION |
|---|---|---|---|---|---|---|---|
| $i_a$ | $\{(long,lat)\}_{ia}$ | $\{j\}_{ia}$ | NULL | NULL | False | i | NULL |
| $i_b$ | $\{(long,lat)\}_{ib}$ | $\{j\}_{ib}$ | NULL | NULL | False | i | NULL |

FIG. 19

| TRAVELLING SEGMENT ID | RANGE | ADJACENT ID | CURRENT FEATURE DISTRO | DEFINITION TIME DISTRO | SIMILARITY CALCULATION FLAG | ID BEFORE DIVISION | ID BEFORE COMBINATION |
|---|---|---|---|---|---|---|---|
| $i_{34}$ | $\{\{(long,lat)\}_{i3}, \{(long,lat)\}_{i4}\}$ | $\{j\}_{i34}$ | NULL | NULL | False | NULL | $(i_3, i_4)$ |

FIG. 27

| TRAVELLING SEGMENT ID | RANGE | ADJACENT ID | CURRENT FEATURE DISTRO | DEFINITION TIME DISTRO | SIMILARITY CALCULATION FLAG | ID BEFORE DIVISION | ID BEFORE COMBINATION | SAMPLE SUFFICIENCY LEVEL | AVERAGE LOG LIKELIHOOD |
|---|---|---|---|---|---|---|---|---|---|
| i | {(long,lat)}$_i$ | {j}$_i$ | NULL | NULL | False | NULL | NULL | NULL | NULL | ns # DRIVING-STATE DATA STORAGE APPARATUS

CROSS REFERENCE TO RELATED APPLICATION

This application is based on and claims the benefit of priority from Japanese Patent Application No. 2016-093861 filed on May 9, 2016 and Japanese Patent Application No. 2016-219659 filed on Nov. 10, 2016, the disclosure of each of which is incorporated in its entirety herein by reference.

TECHNICAL FIELD

The present disclosure relates to driving-data storage apparatuses that store driving-state data items collected from each of plural vehicles at its travelling location.

BACKGROUND

Cruise-assist systems for assisting driving of a target vehicle have been recently proposed.

Such a cruise-assist system collects, from each of other vehicles except for the target vehicle, driving-state data items including driver's driving operations and/or an ambient environment in the corresponding one of the other vehicles. Then, the cruise-assist system stores the driving-state data items collected from each of the other vehicles such that each of the driving-state data items is correlated with the corresponding collected location.

The cruise-assist system is configured to assist, when the vehicle to be assisted is travelling at a predetermined location, the travelling of the vehicle to be assisted in accordance with the driving-state data items being stored which are correlated with the predetermined location.

For example, a cruise-assist system disclosed in Japanese Patent Application Publication No. 2016-6597 collects, from each of plural vehicles, referred to as sample vehicles, probe information items including its position information, its vehicle speed information, and its fuel economy information. Then, the cruise-assist system divides the probe information items into plural groups for the respective models of the plural vehicles, and collects driving data items divided for each of the vehicle model identifiers; the vehicle model identifiers correspond to the respective models of the plural vehicles.

In particular, the cruise-assist system is configured such that each road is comprised of plural sections between adjacent intersections on the corresponding road. The plural sections of each road will be referred to as road links.

Specifically, the cruise-assist system collects, for each road link, the probe information items from each of the sample vehicles that is travelling on the corresponding road link.

Then, the cruise-assist system obtains, based on the probe information items of each of the vehicle model identifiers collected for each of the road links, control information about minimizing the fuel economy for the corresponding vehicle model identifier and for the corresponding road link. The control information for each of the vehicle model identifiers include, for example, a rotational speed of a main engine of the vehicle corresponding to the vehicle model identifier, information indicative of the gear position of a transmission of the vehicle, and information indicative of the speed of the vehicle.

The cruise-assist system stores, in a database, the control information for each vehicle model identifier and for each road link such that the control information for the corresponding vehicle model identifier is correlated with the corresponding road link.

When a vehicle to be assisted is travelling on a road link, the cruise-assist system reads, from the database, the control information corresponding to the type of the assisted vehicle and being correlated with the road link. Then, the cruise-assist system performs, based on the readout control information, cruise-assist of the assisted vehicle such that the energy efficiency of the assisted vehicle becomes higher.

SUMMARY

The cruise-assist system stores, for each road link, the control information for each of the vehicle model identifiers.

Unfortunately, values of the driving-state data items, i.e. probe information items, are not limited to be constant, i.e. changed, during each of the road links. For example, in a road link, the speed of each sample vehicle when the sample vehicle is travelling on a region immediately before an intersection is drastically changed as compared to the speed of the sample vehicle when the sample vehicle is travelling on the other regions.

From this viewpoint, the cruise-assist system obtains the control information while the driving-state data items corresponding to each vehicle model identifier in a road link are constant in the road link. For this reason, the cruise-assist control system may result in the accuracy of the control information for each of the vehicle model identifiers obtained in each of the road links deteriorating.

In view of the circumstances set forth above, a first aspect of the present disclosure seeks to provide driving-state data storage apparatuses, which are capable of addressing the problem set forth above.

Specifically, a second aspect of the present disclosure aims to provide such driving-state data storage apparatuses, each of which is capable of storing, with higher accuracy, values of driving-state data items indicative of each of plural vehicles on a target travelling road.

A driving-state data storage apparatus according to an exemplary aspect of the present disclosure includes a collector configured to collect, from each of a plurality of vehicles on a target travelling road, a value of data indicative of a driving state of the corresponding vehicle to correspondingly obtain driving-state data values for the target road. The driving-state data storage apparatus includes a data allocator configured to perform an allocation task to 1. Divide, based on similarity among the driving-state data values, the target traveling road into a plurality of traveling segments;
2. Extract, from the driving-state data values, data values for each of the divided travelling segments, the data values extracted for each of the travelling segments being similar to each other
3. Allocate a distribution of the extracted data values for each of the divided travelling segments to the corresponding one of the divided travelling segments as a feature distribution The driving-state data storage apparatus includes a storage unit configured to store the feature distribution allocated for each of the travelling segments.

The exemplary aspect enables the feature distribution to be stored for each of the travelling segments, the driving-state data values for the corresponding travelling segment being similar to each other. This therefore stores the feature distribution of driving state according to each of the travelling segments with higher accuracy.

BRIEF DESCRIPTION OF THE DRAWINGS

Other aspects of the present disclosure will become apparent from the following description of embodiments with reference to the accompanying drawings in which.

Figure 1:
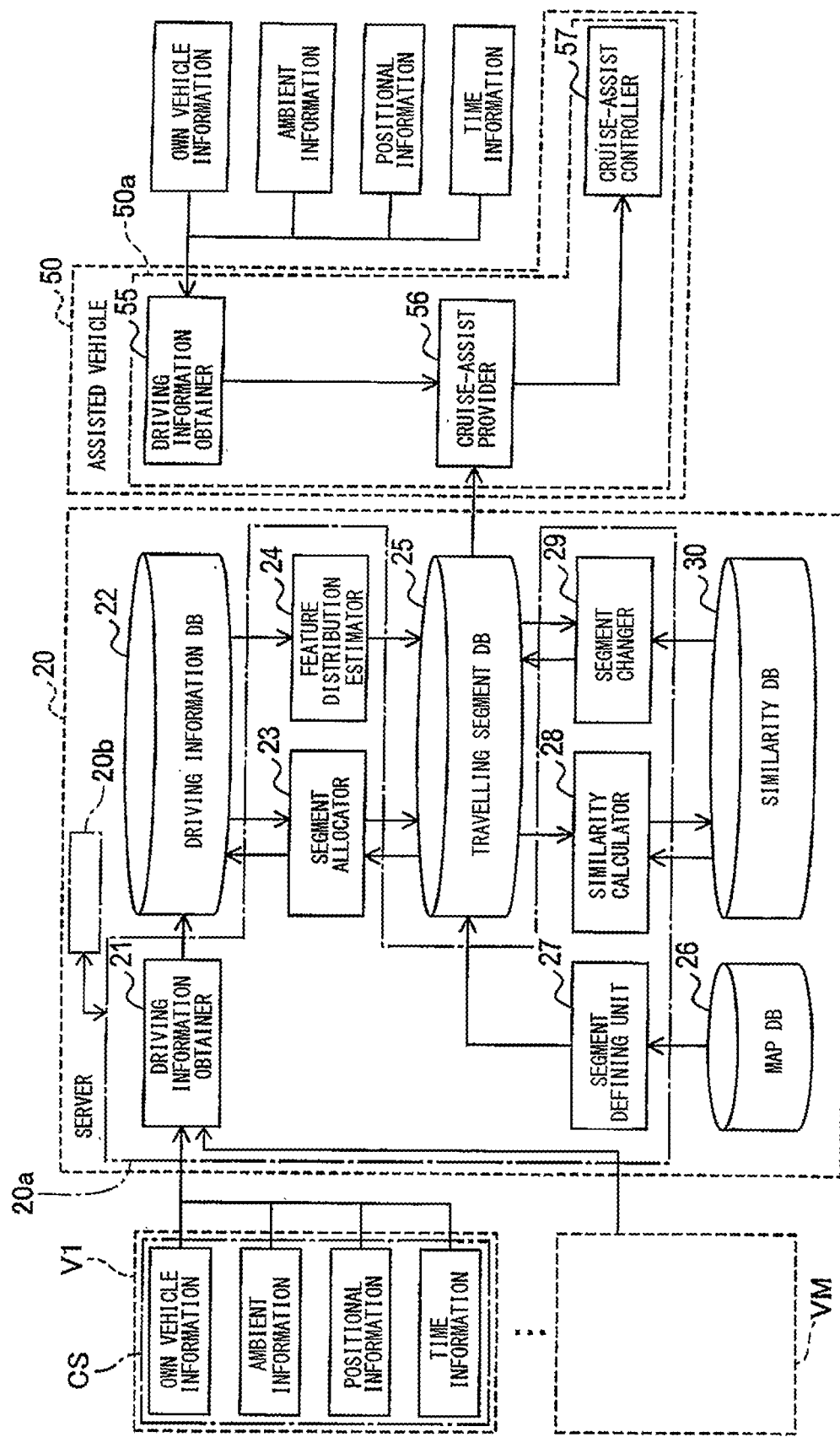
FIG. 1 is a block diagram schematically illustrating a cruise-assist system according to the first embodiment of the present disclosure.
Figure 3:
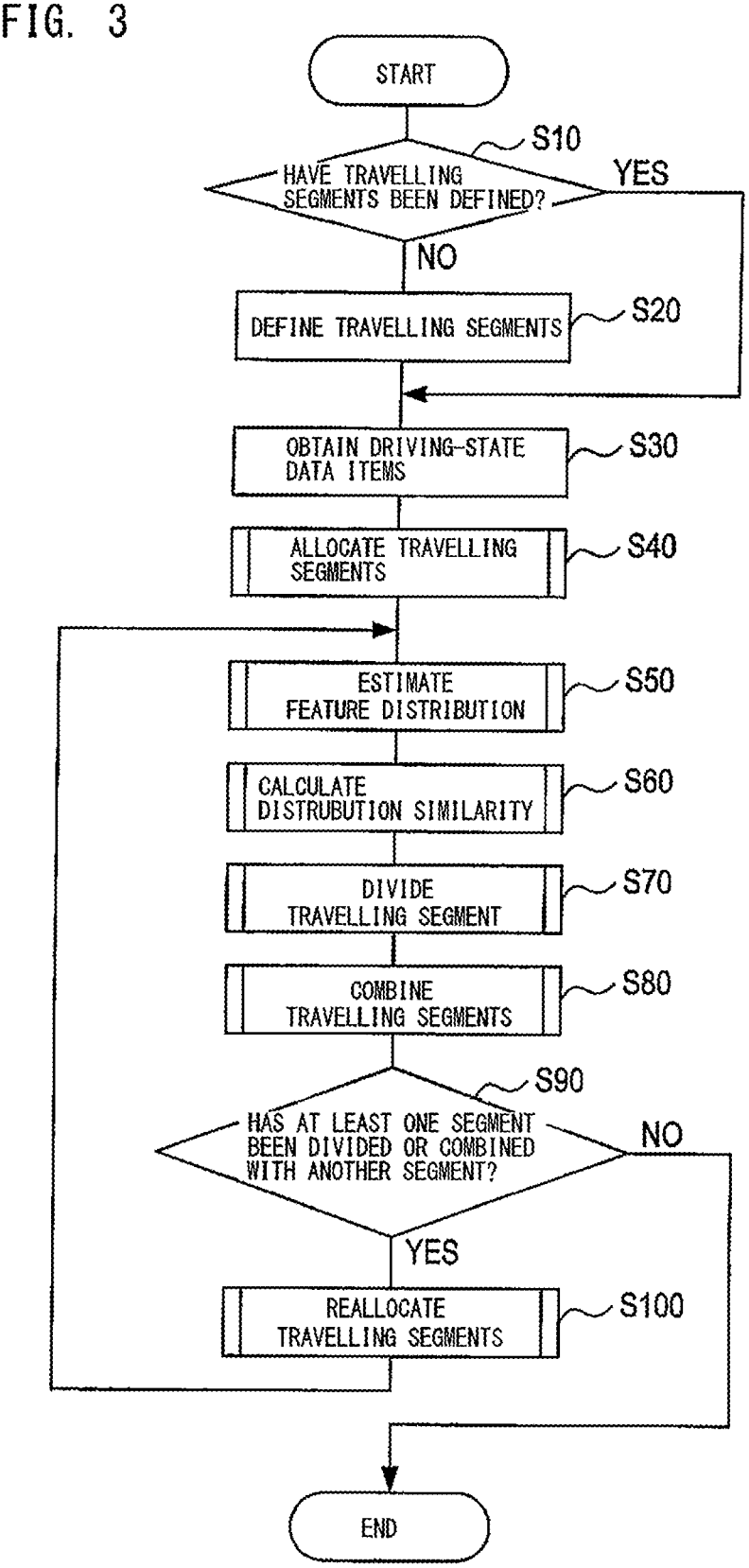
Figures 4, 5, 6:
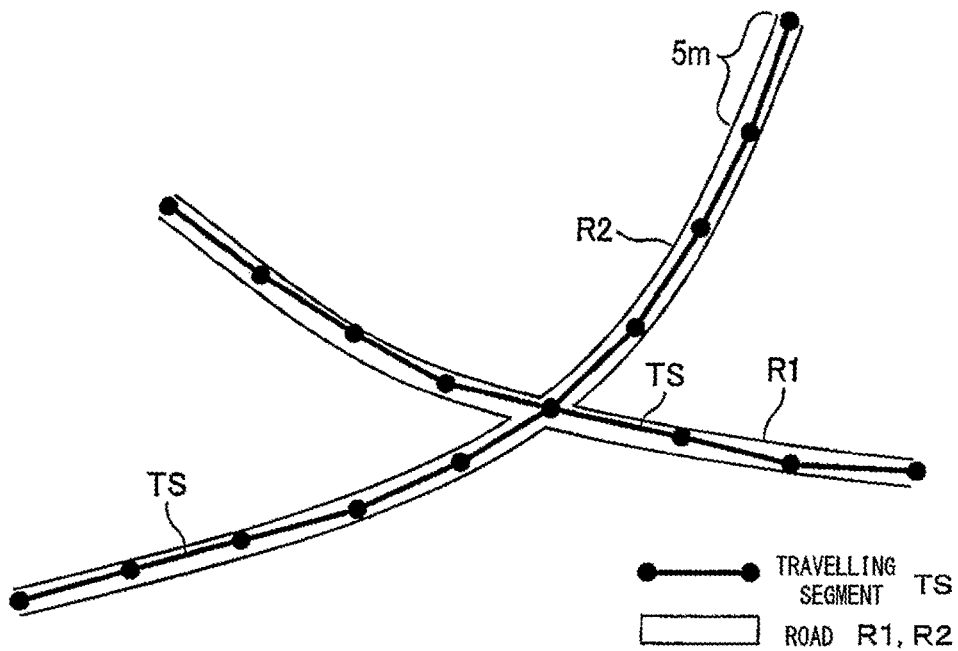
Figure 9:
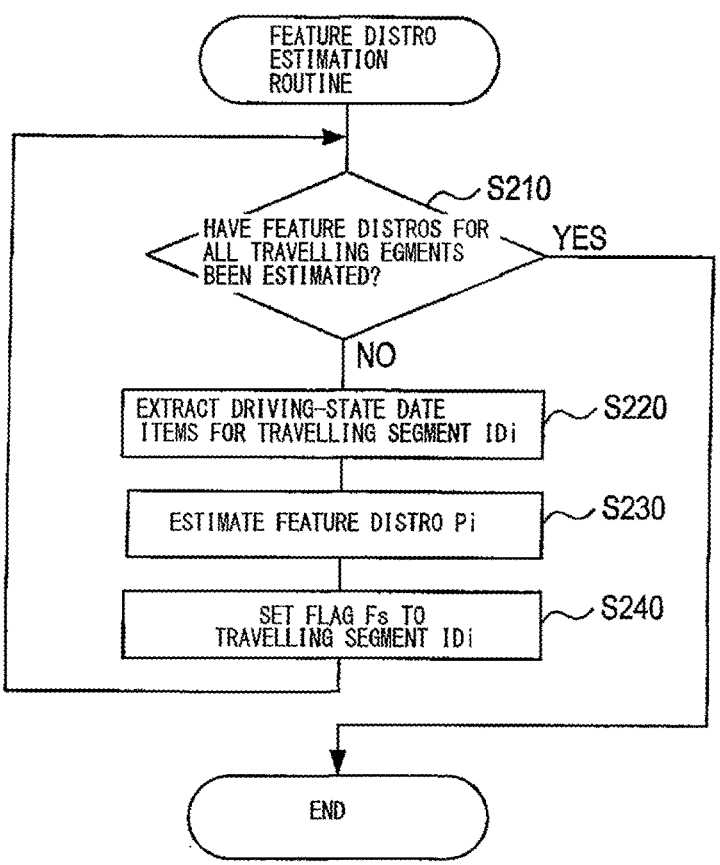
Figure 10:
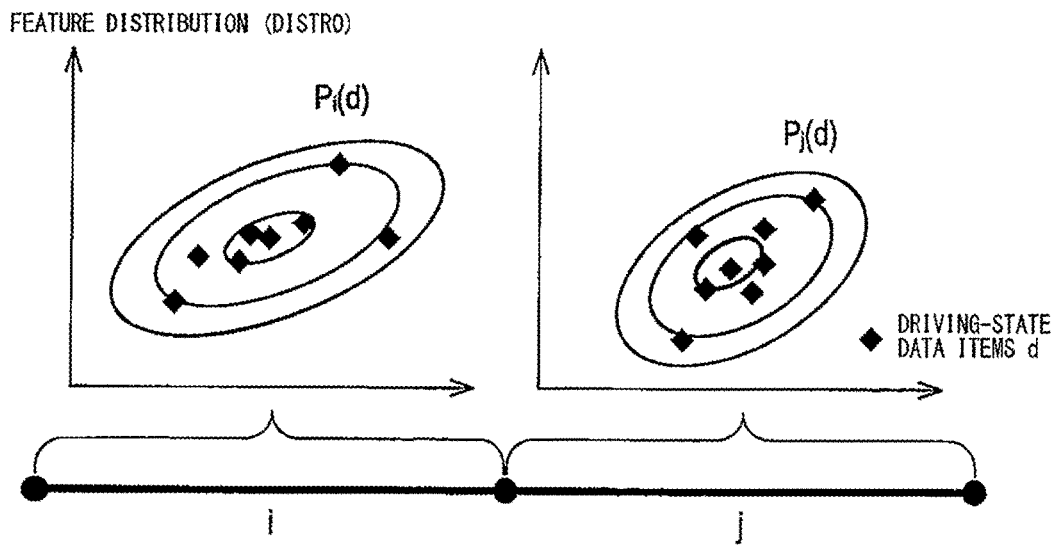
Figures 11, 12, 13:
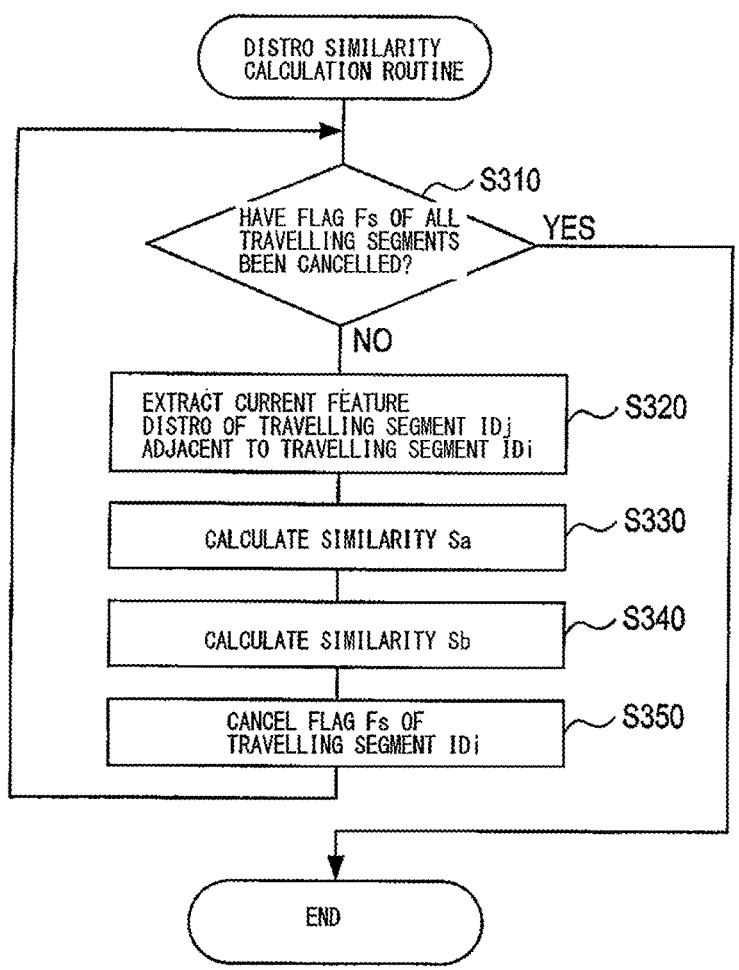
Figure 14:
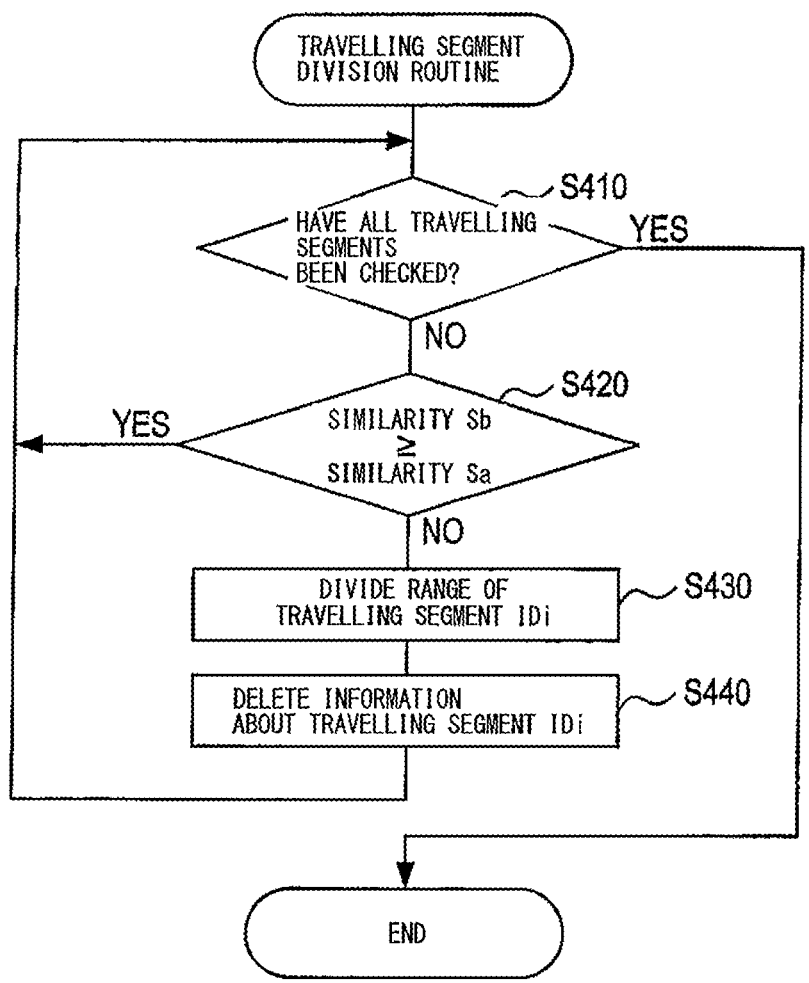
Figures 15, 16:
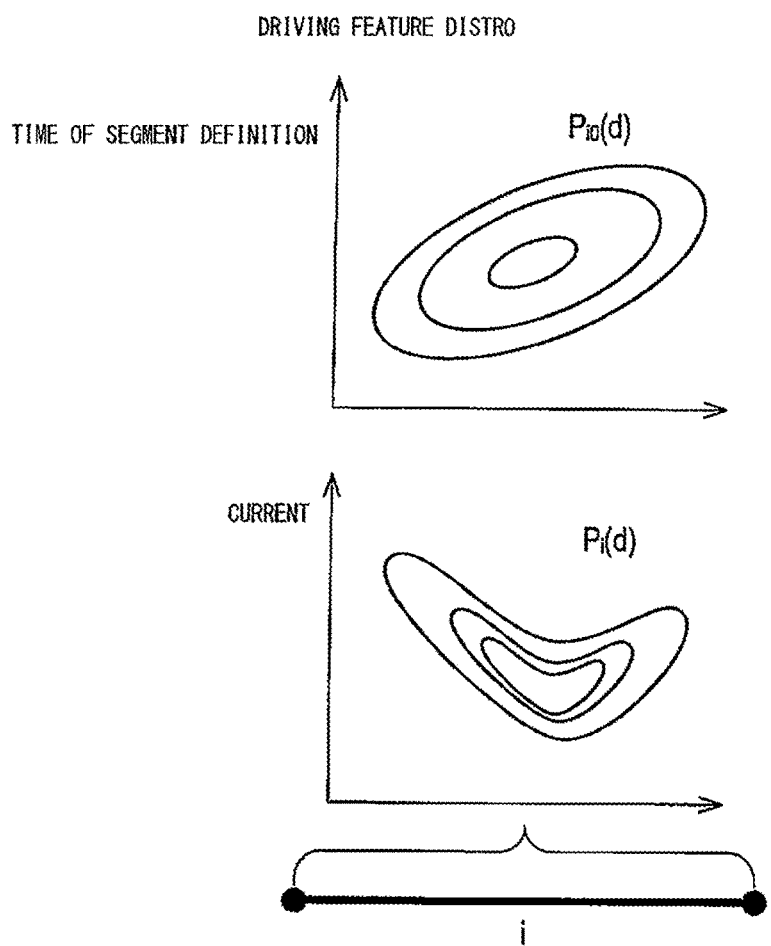
Figure 17:
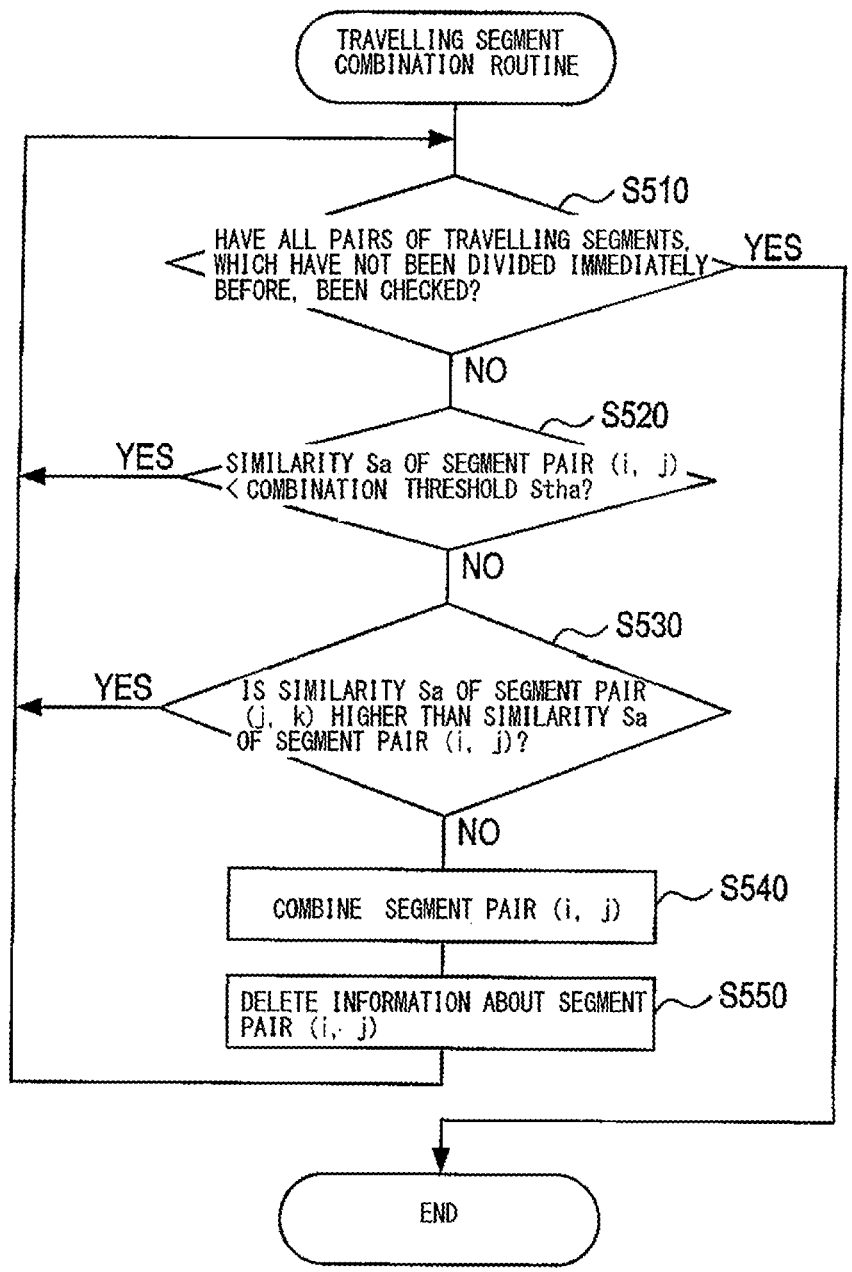
Figure 18:
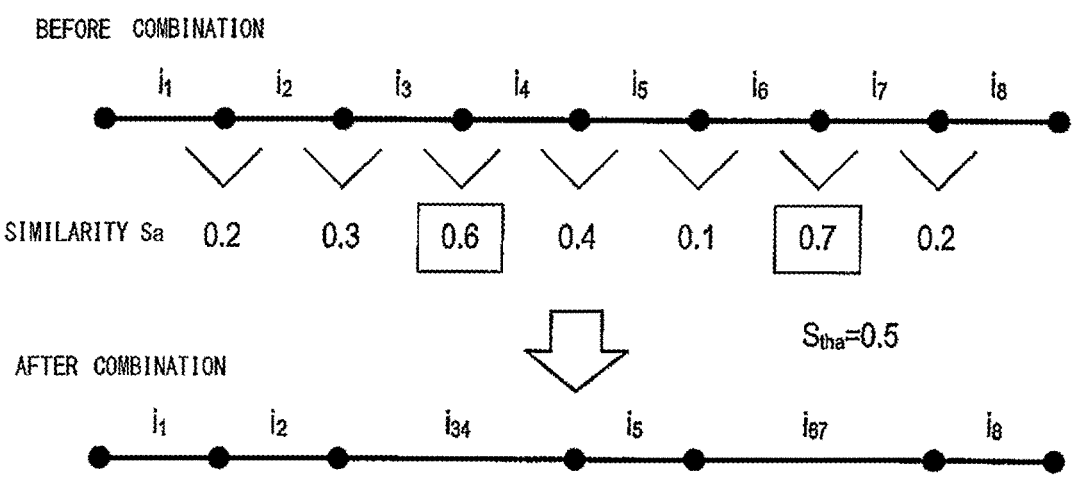
Figure 20:
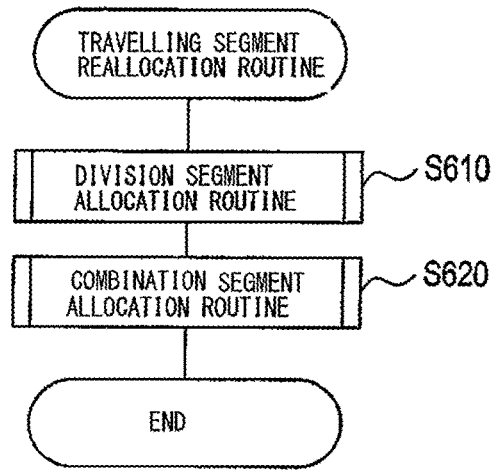
Figure 21:
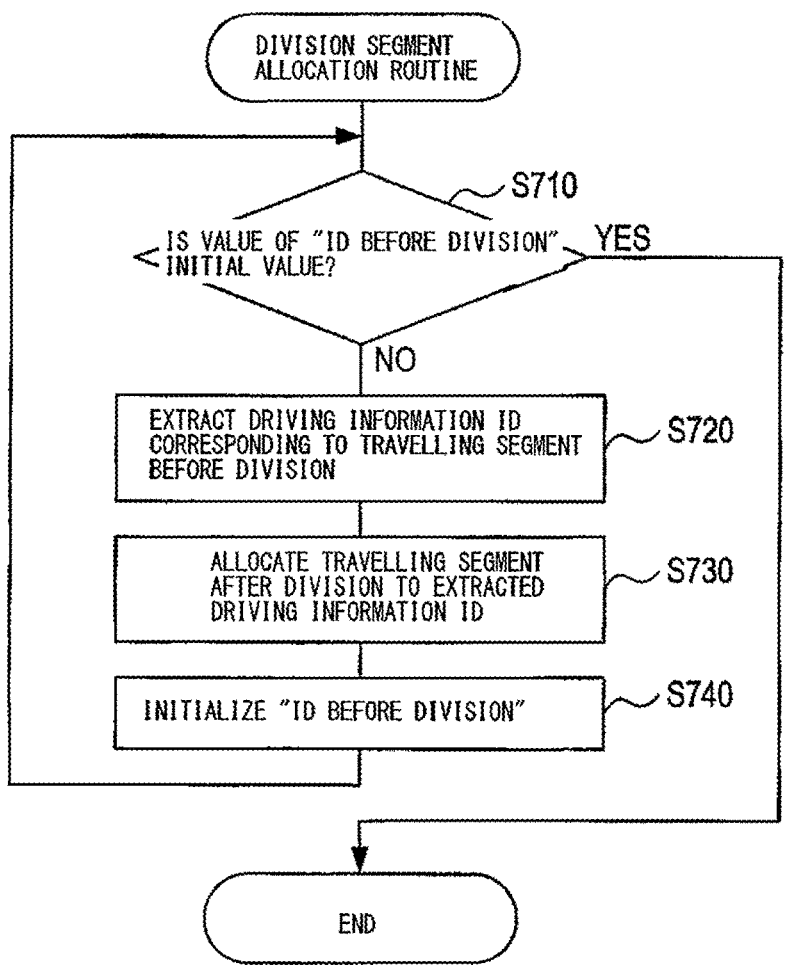
Figure 22:
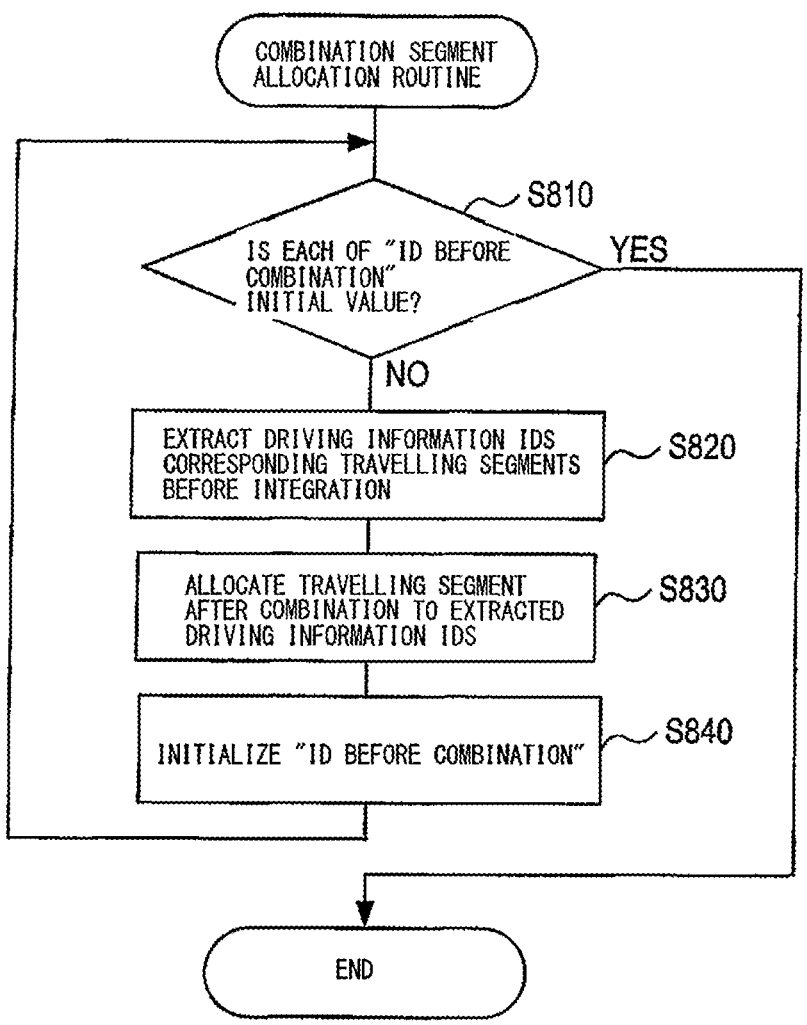
Figure 23:
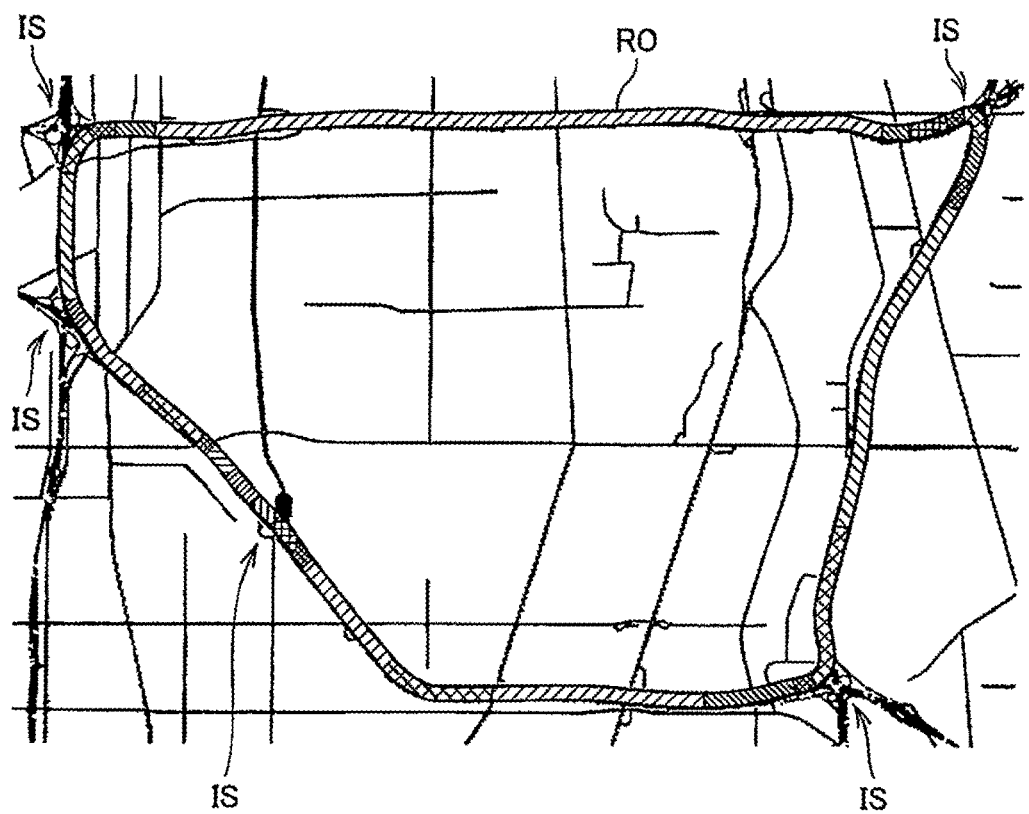
Figure 24:
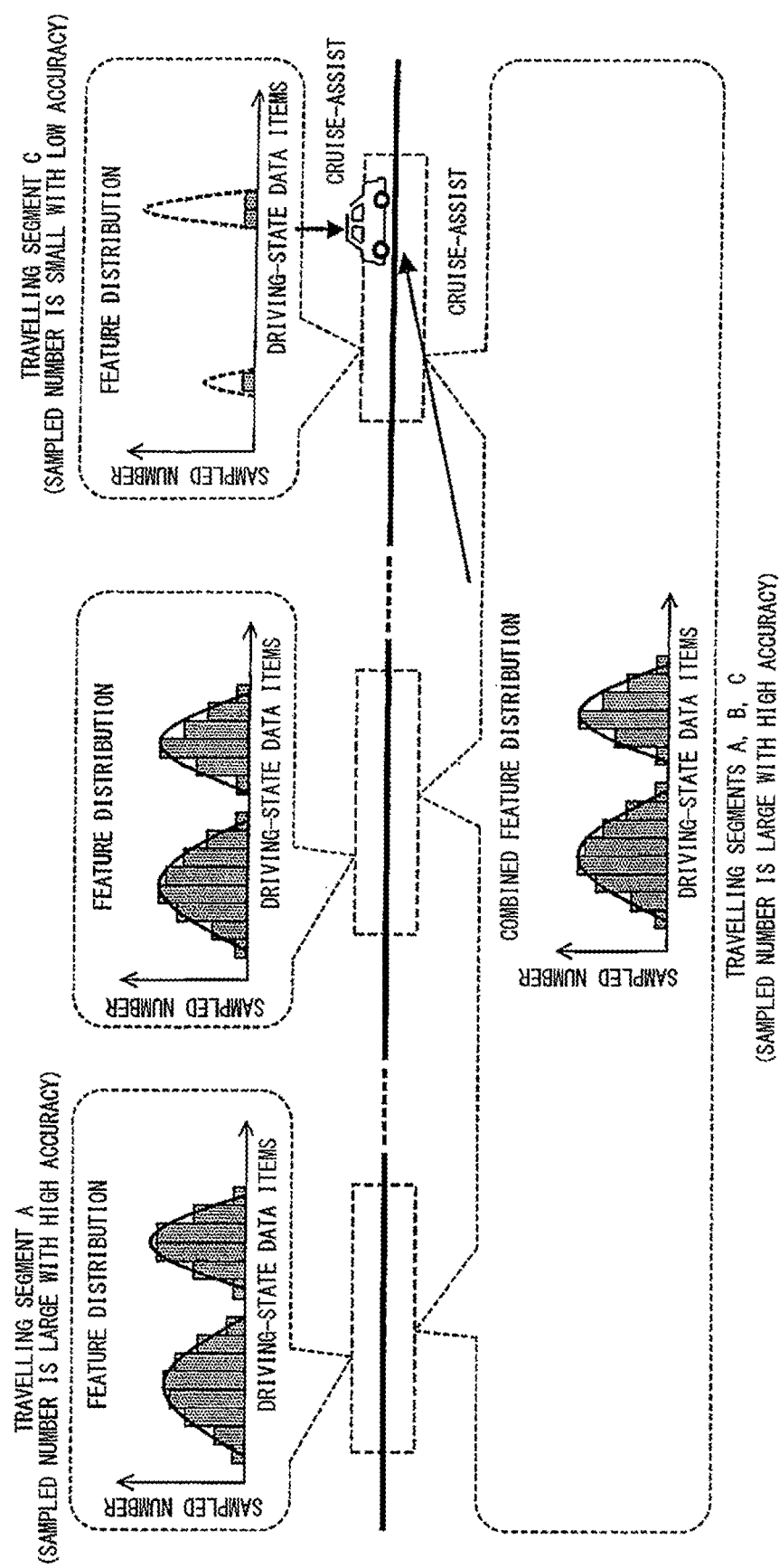
Figure 25:
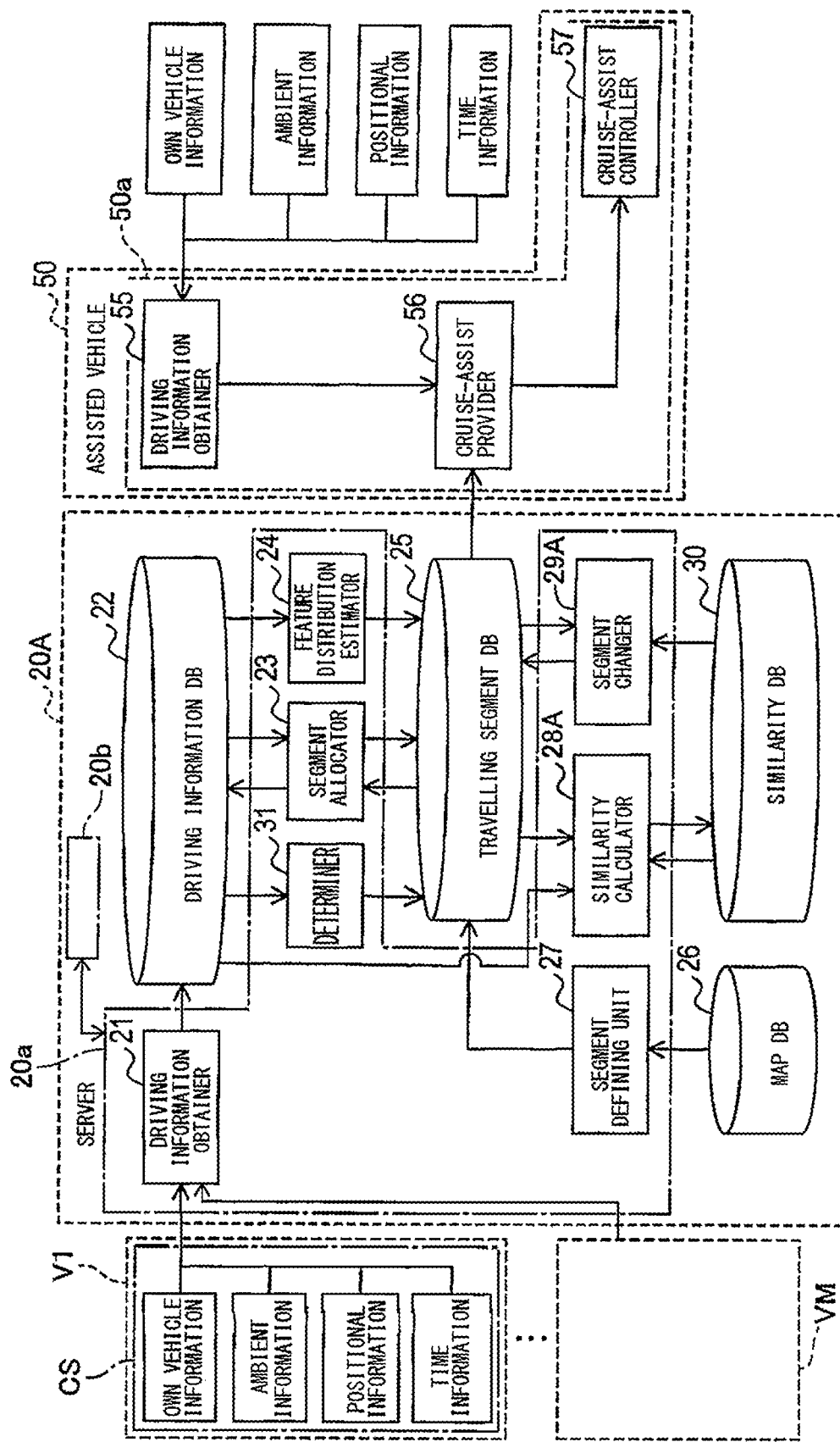
Figure 26:
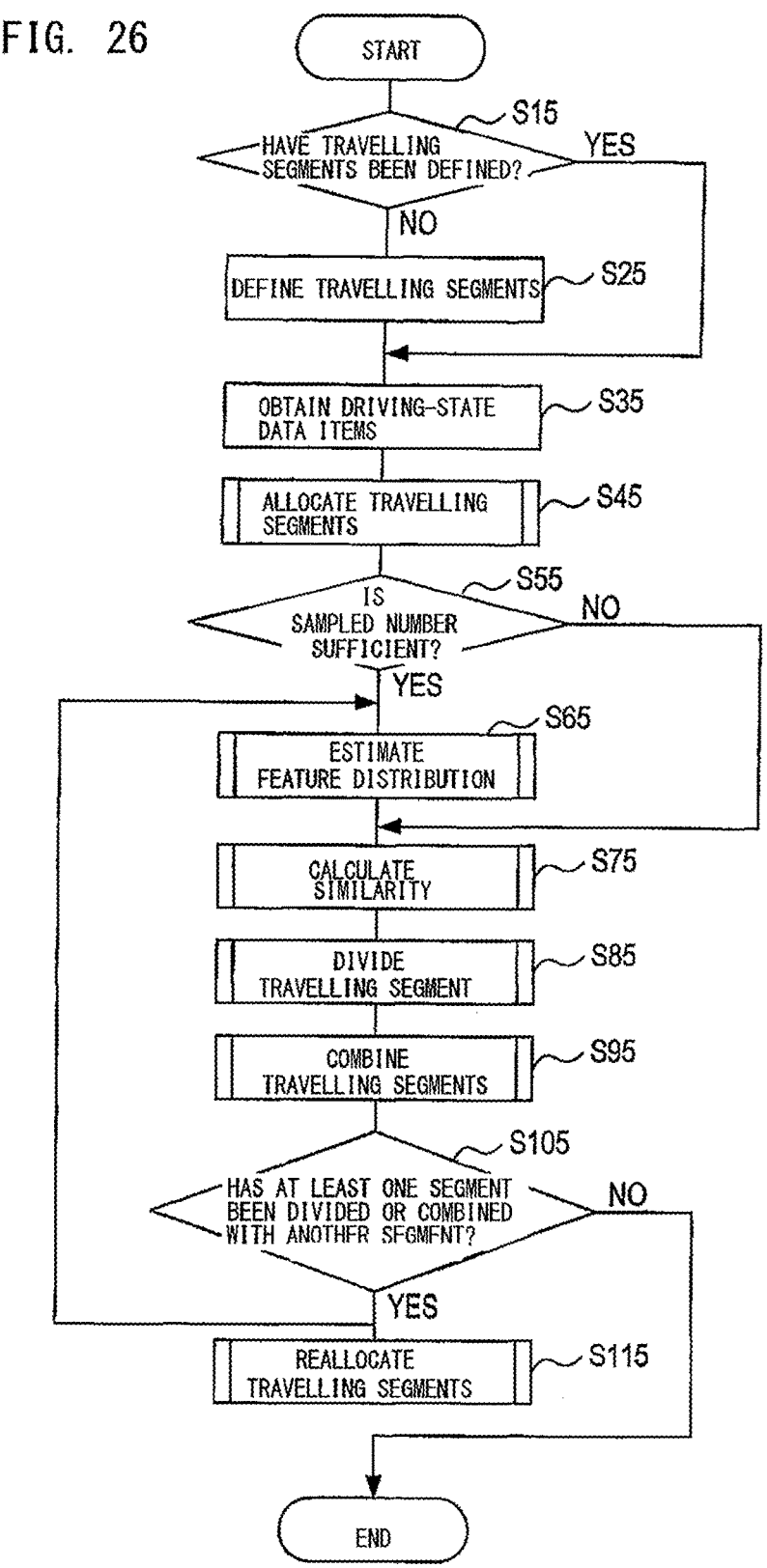
Figure 28:
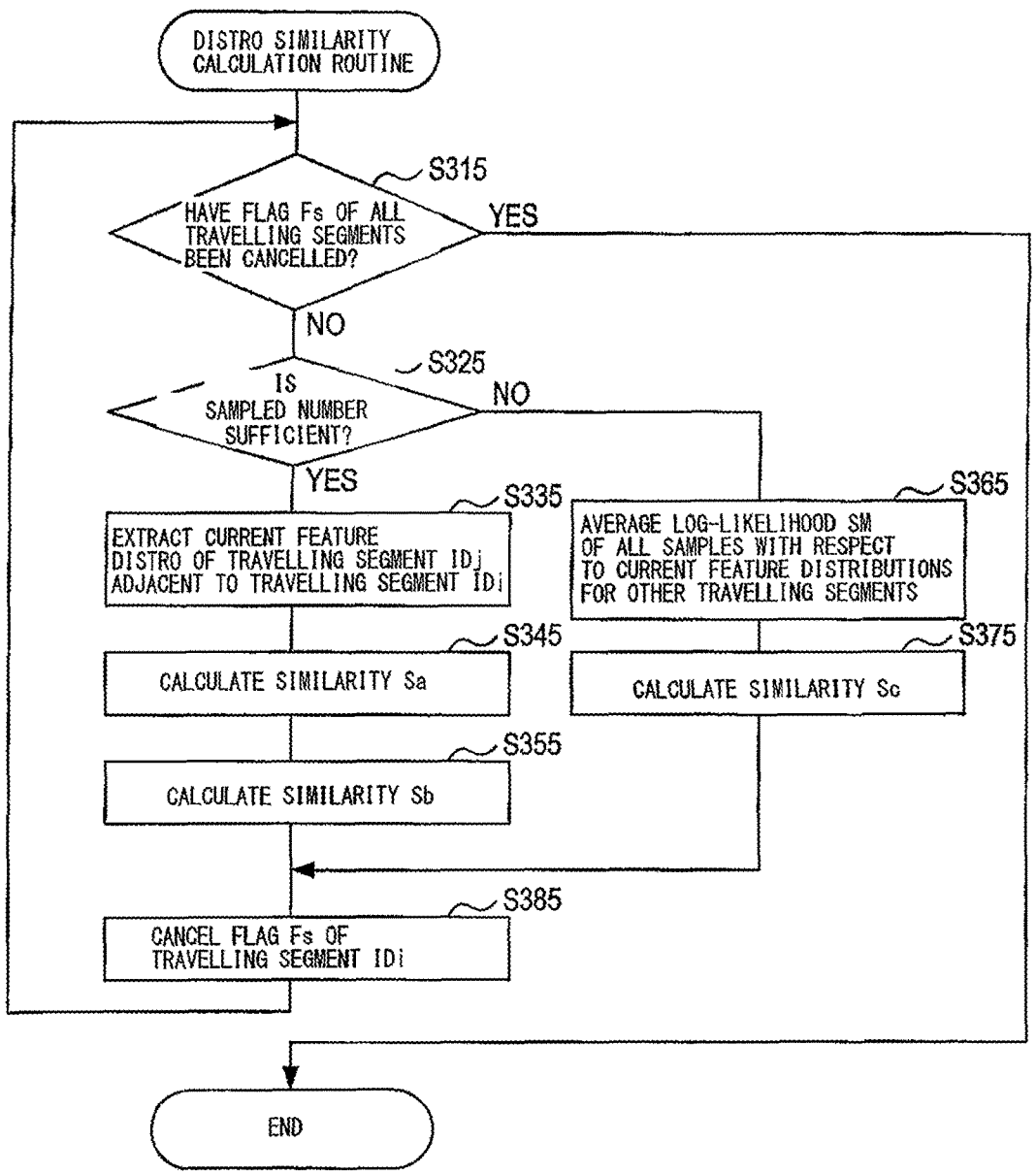
Figure 29:
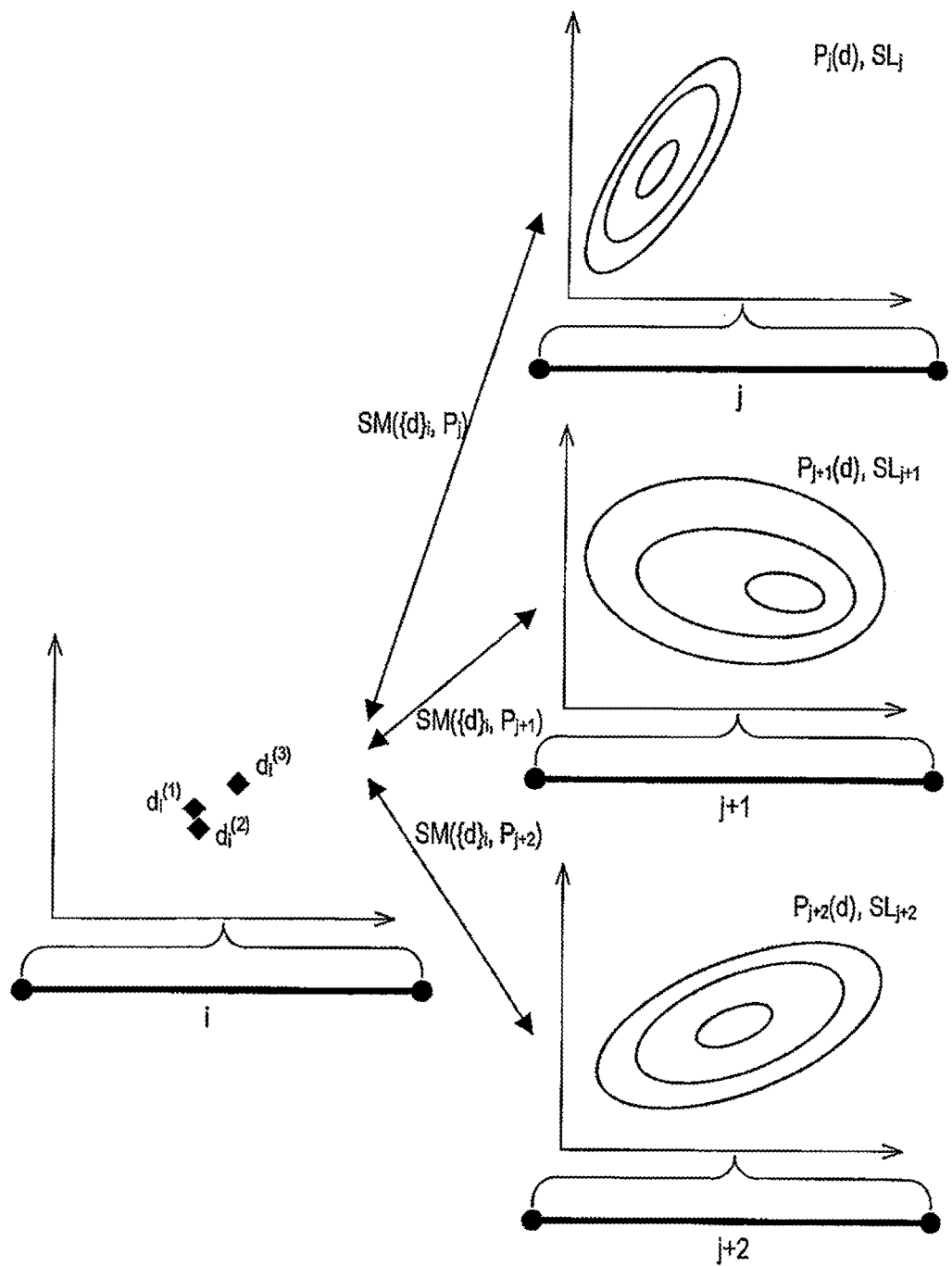
Figure 30:
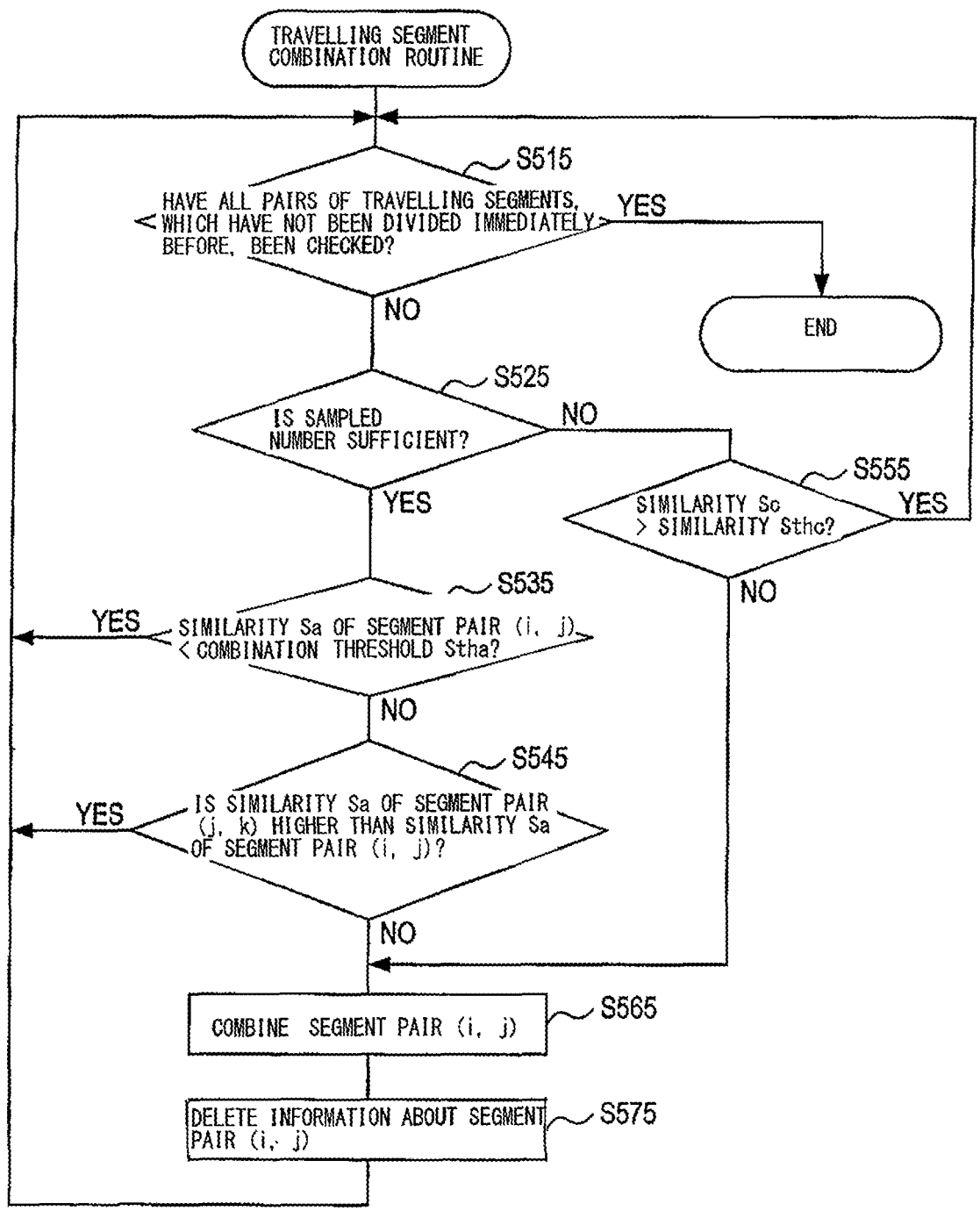

1. Units in each of which driving-state data items are stored according to the conventional system 2. Units in each of which driving-state data items are stored according to the first embodiment;

FIG. 3 is a flowchart schematically illustrating a feature distribution storing routine according to the first embodiment;

FIG. 4 is a diagram illustrating an example of travelling segments defined based on division of a road on a map;

FIG. 5 is a diagram illustrating an example of contents of data stored in a travelling segment database according to the first embodiment;

FIG. 6 is a diagram illustrating an example of contents of data stored in a driving information database according to the first embodiment;

FIG. 7 is a flowchart schematically illustrating a travelling segment allocation routine according to the first embodiment;

FIG. 8 is a diagram illustrating an example of contents of data, to which a travelling segment has been allocated, stored in the driving information database according to the first embodiment;

FIG. 9 is a flowchart schematically illustrating a feature distribution estimation routine according to the first embodiment;

FIG. 10 is a diagram illustrating an example of a feature distribution estimated for each travelling segment;

FIG. 11 is a diagram illustrating an example of contents of data stored in the travelling segment database in which the feature distributions have been estimated according to the first embodiment;

FIG. 12 is a flowchart schematically illustrating a similarity calculation routine according to the first embodiment;

FIG. 13 is a diagram illustrating an example of contents of data stored in a similarity database according to the first embodiment;

FIG. 14 is a flowchart schematically illustrating a travelling segment division routine according to the first embodiment;

FIG. 15 includes graphs that illustrate that a feature distribution obtained at definition of a corresponding travelling segment is changed to a current feature distribution;

FIG. 16 is a diagram illustrating an example of contents of data correlated with a divided travelling segment in the travelling segment database;

FIG. 17 is a flowchart schematically illustrating a travelling segment combination routine according to the first embodiment;

FIG. 18 is a diagram illustrating plural travelling segments before combination, similarities among the current feature distributions of the plural travelling segments, and combined travelling segments;

FIG. 19 is a diagram illustrating an example of contents of data correlated with a combined travelling segment in the travelling segment database;

FIG. 20 is a flowchart schematically illustrating a travelling segment reallocation routine according to the first embodiment;

FIG. 21 is a flowchart schematically illustrating a division segment allocation routine illustrated in FIG. 20;

FIG. 22 is a flowchart schematically illustrating a combination segment allocation routine illustrated in FIG. 20;

FIG. 23 is a diagram illustrating an example of a result of the construction of a travelling segment database corresponding to a target road based on a simulation carried out by the server illustrated in FIG. 1;

FIG. 24 is a diagram schematically illustrating a feature distribution for a travelling segment in which the number of sampled driving-state data items is small as compared with a feature distribution for each of travelling segments in which the number of sampled driving-state data items is large;

FIG. 25 is a block diagram schematically illustrating a cruise-assist system according to the second embodiment of the present disclosure;

FIG. 26 is a flowchart schematically illustrating a feature distribution storing routine according to the second embodiment;

FIG. 27 is a diagram illustrating an example of contents of data stored in a travelling segment database according to the second embodiment;

FIG. 28 is a flowchart schematically illustrating a similarity calculation routine according to the second embodiment;

FIG. 29 is a diagram schematically illustrating an example of a method of calculating an average likelihood of driving-state data items to each of feature distributions; and FIG. 30 is a travelling segment combination routine according to the second embodiment.

DETAILED DESCRIPTION OF EMBODIMENT

The following describes embodiments of the present disclosure with reference to the accompanying drawings. In the embodiments, like parts between the embodiments, to which like reference characters are assigned, are omitted or simplified to avoid redundant description.

First Embodiment

Structure

FIG. 1 is a block diagram illustrating a schematic structure of a cruise-assist system 100 according to the first embodiment of the present disclosure.

The cruise-assist system 100 includes a server 20, and a computer terminal 50a installed in an assisted vehicle 50 whose cruising operations are assisted by the server 20.

First, the following describes the structure of the server 20 with reference to FIG. 1.

The server 20 is installed in, for example, an information center. The server 20 is wireless communicably connected to a control system CS, which is configured as a computer system, installed in each of travelling vehicles, which will be referred to as sample vehicles. The server 20 is also wireless communicably connected to the assisted vehicle 50. The server 20 according to the first embodiment corresponds to, for example, a driving-state storage apparatus or a driving-state data storage apparatus. In the first embodiment, the number of the sample vehicles is set to M that is an integer equal to or more than 1, and reference characters V1 to VM are assigned to the respective sample vehicles.

Hereinafter, the structure and functions of the sample vehicle V1 will be described. The structures and functions of the other sample vehicles V2 to VM are identical to the structure and functions of the sample vehicle V1.

The control system CS of the sample vehicle, which will be referred to as an own vehicle, V1 includes plural sensors installed to the own vehicle V1. The control system CS repeatedly sends, to the server 20, driving-state data items repeatedly collected by the sensors, using radio communications.

The driving-state data items include plural data items representing the driving state of the own vehicle V1. For example, the driving-state data items include own vehicle information, ambient information, positional information, and time information.

The own vehicle information includes driving operation information by a driver of the own vehicle V1, and vehicle behavior information, which are monitored by the sensors installed to the own vehicle V1.

The driving operation information includes, for example, the position of an accelerator pedal operable by a driver of the own vehicle V1, i.e. the position of a throttle valve. The own vehicle information also includes an operated pressure, i.e. a brake pressure, of a brake pedal operable by the driver, and a steering angle of the own vehicle V1 operable by the driver.

The vehicle behavior information includes, for example, the speed, i.e. vehicle speed, of the own vehicle V1, and values of six-axis acceleration including 1. Values of acceleration in the respective pitch axis, roll axis, and yaw axis of the own vehicle V1

2. Values of acceleration about the respective pitch axis, roll axis, and yaw axis of the own vehicle V1

The ambient information includes, for example, the relative positions of other vehicles located around the own vehicle V1 relative to the own vehicle V1, which are monitored by the corresponding sensor installed in the own vehicle V1. The ambient information also includes, for example, the relative speed of each of the other vehicles relative to the own vehicle V1, and weather information indicative of the weather condition, such as a fine condition or a rain condition, around the own vehicle V1 at each data measurement timing The positional information and time information include the current travelling position of the own vehicle V1 and the current time obtained based on global positioning system (GPS) signals, which are sent from GPS satellites, received by a GPS receiver installed in the own vehicle V1 as the corresponding sensor.

The server 20 receives the driving-state data items sent from each of the sample vehicles V1 to VM, and generates, based on the driving-state data items, a driving-state data distribution for each of travelling segments described later. Then, the server 20 stores the generated driving-state data distributions for the respective travelling segments to be correlated with the corresponding travelling segments. How to generate the driving-state data distributions will be described later. The driving-state data distribution for each of the travelling segments represents a norm of the driving state during the corresponding travelling segment. Note that the driving-state data distribution cannot include the ambient information and the time information.

The assisted vehicle 50 includes an electronic control unit (ECU) 50a configured mainly as a computer system including a CPU, a RAM, a ROM, and an I/O; the ROM is an example of a non-transitory storage medium. The ECU 50a runs one or more programs stored in the ROM as an example of a non-transitory storage medium, thus implementing the functions of respective driving information obtainer 55, cruise-assist provider 56, and cruise-assist controller 57. In other words, the ECU 50a functionally includes the driving information obtainer 55, cruise-assist provider 56, and cruise-assist controller 57. At least part or the whole of each of the functional modules 55, 56, and 57 can be implemented as a hardware circuit.

The driving information obtainer 55 obtains the driving-state data items corresponding to a target travelling segment on which the assisted vehicle 50 is travelling; the target travelling segment is one of the travelling segments.

The driving information obtainer 55 obtains the driving-state data items that substantially correspond to the driving-state data items for each of the sample vehicles V1 to VM.

The cruise-assist provider 56 receives, from the server 20, the driving-state data distribution using radio communications; the driving-state data distribution is correlated with the target travelling segment on which the assisted vehicle 50 is travelling. Then, the cruise-assist provider 56 compares the driving-state data distribution sent from the server 20 with the driving-state data. On the basis of the comparison results between the driving-state data distribution and the driving-state data of the assisted vehicle 50, the cruise-assist provider 56 determines an operational controlled variable for each of actuators that determine the cruise-state of the assisted vehicle 50. The actuators include actuators that steer the assisted vehicle 50 and actuators that brake the assisted vehicle 50. Then, the cruise-assist provider 56 sends the operational controlled variable for each of the actuators to the cruise-assist controller 57.

The cruise-assist controller 57 controls the actuators in accordance with the respective operational controlled variables, thus carrying out drive-assist control of the assisted vehicle 50.

The server 20 includes a computer including a CPU 20a, a memory device 20b, and an I/O; the memory device 20b includes a RAM and a ROM that is an example of a non-transitory storage medium. The CPU 20a of the server 20 runs one or more programs stored in the ROM as an example of a non-transitory storage medium. This implements a driving information obtainer 21, a segment allocator 23, a feature distribution estimator 24, a segment defining unit 27, a similarity calculator 28, and a segment changer 29. At least part or the whole of each of the functional modules 21, 23, 24, 27, 28, and 29 can be implemented as a hardware circuit.

For example, the driving information obtainer 21 serves as a collector, and the segment allocator 23, feature distribution estimator 24, segment defining unit 27, similarity calculator 28, and segment changer 29 serve as, for example, a data allocator.

The server 20 also includes four databases of a driving information database (DB) 22, a travelling segment DB 25, a map DB 26, and a similarity DB 30.

As described above, the server 20 receives the driving-state data items sent from each of the sample vehicles V1 to VM, and generates a driving-state data distribution, i.e. a diving feature distribution, for each of the travelling segments. Then, the server 20 stores, in the travelling segment DB 50, the driving-state data distributions for each travelling segment to be correlated with the corresponding travelling segment.

The server 20 also extracts, from the travelling segment DB 50, the driving-state data distribution corresponding to a predetermined travelling position requested from the ECU 50a of the assisted vehicle 50. Then, the server 20 transmits, to the ECU 50a of the assisted vehicle 50, the extracted driving-state data distribution.

Figure 2:
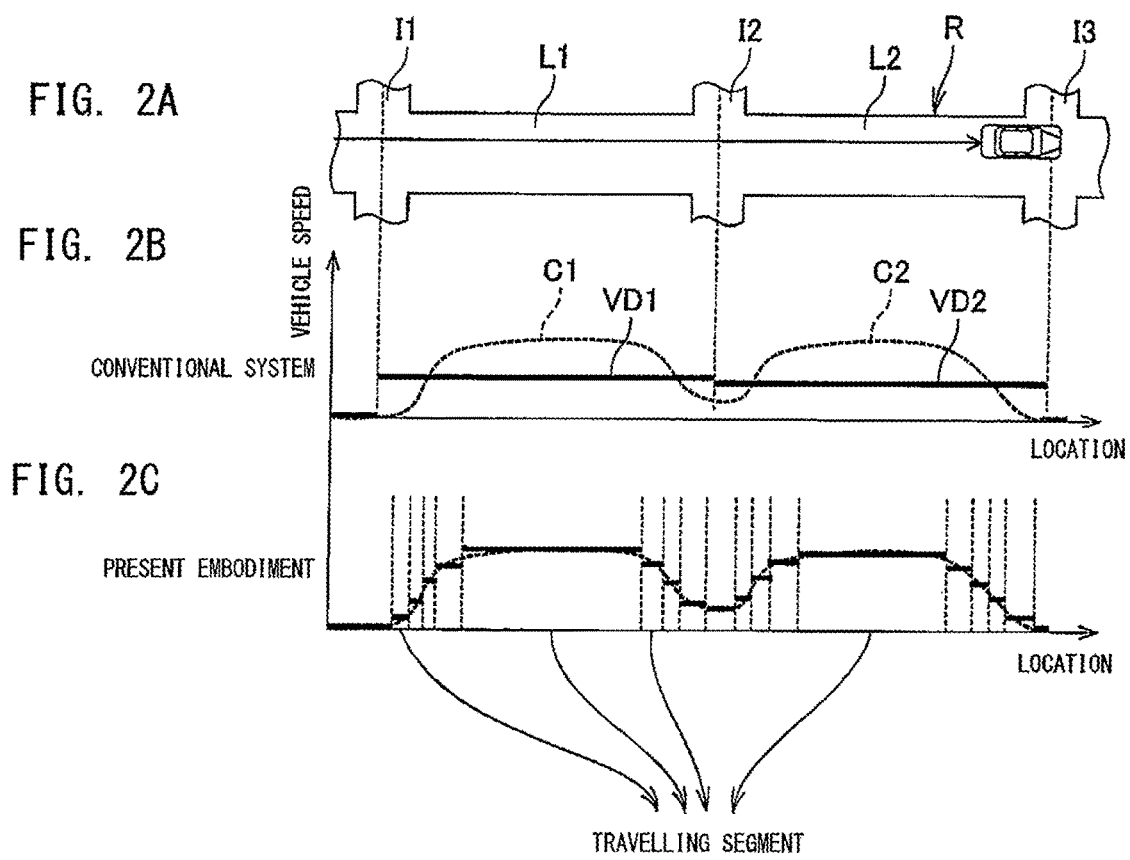
FIGS. 2A to 2C is a joint timing chart schematically illustrating

FIG. 2A schematically illustrates a part of a road R including intersections I1, I2, and I3. FIG. 2B also illustrates road links L1 and L2 constituting the road R partitioned by the cruise-assist system, which will be referred to as a conventional system, disclosed in Japanese Patent Application Publication No. 2016-6597, which will be referred to as a conventional publication. FIG. 2B illustrates an example of how the speed of a sample vehicle travelling on each of the road links L1 and L2 is changed, using a corresponding one of dashed lines C1 and C2. FIG. 2B also illustrates vehicle speed data VD1 and vehicle speed data VD2 for the respective road links L1 and L2 stored in a database of the conventional system, using solid lines.

As illustrated in FIG. 2B, in the conventional system, the vehicle speed data VD1 averaged over the road link L1 and the vehicle speed data VD2 averaged over the road link L2 are stored.

In contrast, the actual vehicle speed of the sample vehicle for the road link L1 becomes a low speed at a point adjacent to each of the intersections I1 and I2 as illustrated by the dashed line C1. The actual vehicle speed of the sample vehicle increases from the point adjacent toward the intersection I1 to the middle of the road link L1, and the actual vehicle speed is maintained at a constant high level in the middle of the road link L1. In addition, the actual vehicle speed of the sample vehicle decreases from the middle of the road link L1 toward the intersection I2.

Thus, the vehicle speed data VD1 obtained by averaging the vehicle speed over the road link L1 is different from the actual speed at the point adjacent to each of the intersections I1 and I2, and also different from the actual speed in the middle of the road link L1.

Specifically, as described in the conventional system, if the vehicle speed of a sample vehicle travelling through the intersection I1 or I2 of the road link L1 is stored in the database as the averaged speed over the road link L1, the accuracy of the vehicle speed of the sample vehicle stored in the database may become lower. Similarly, if the vehicle speed of a sample vehicle travelling through the middle of the road link L1 is stored in the database as the averaged speed over the road link L1, the accuracy of the vehicle speed of the sample vehicle stored in the database may also become lower. This is the same as the case of the road link L2.

As described above, a method of averaging values of the driving-state data item obtained in a road link if the values of the driving-state data vary widely and of setting the averaged value of the driving-state data item as a value of the driving-state data item in the road link, which is carried out by the conventional system, may deteriorate the accuracy of the driving-state data item. This problem for the case of the vehicle speed as the driving-data item may also be caused for another case of another parameter as the driving-state data item.

Specifically, performing cruise-assist of the assisted vehicle 50 using the database disclosed in the conventional system may cause the accuracy of the cruise-assist to deteriorate.

On the other hand, if the driving-state data items were stored which are correlated with each of continuous latitude and longitude coordinates for each road, a significant amount of data would be stored.

In contrast, the server 20 includes the travelling segment DB 25 storing therein driving-state data items for each of variably set travelling segments.

Specifically, as illustrated in FIG. 2C, properly changing the travelling segments enables similar values of the driving-state data items to be stored in each of the travelling segments.

The following describes in detail routines for constructing the travelling segment DB 25. Note that, in the first embodiment, the travelling segment DB 25 serves as, for example, a segment database, and the driving information DB 22 serves as, for example, an information database. Additionally, the segment changer 29 serves as, for example, a combination and division unit, and the segment allocator 23 serves as, for example, an allocator.

The map DB 26 stores map information including roads on which the sample vehicles V1 to VM and the assisted vehicle 50 can travel.

Routine

Feature Distribution Storing Routine

First, the following schematically describes, with reference to the flowchart of FIG. 3, a feature distribution storing routine that stores a driving-state data distribution, i.e. a driving-state feature distribution, for each of travelling segments of a target road to be carried out by the server 20. The target road is a target road for driving-state data storage.

Note that, in the first embodiment, the sample vehicles V1 to VM is travelling on the target road. Specifically, a driving-state data distribution represents a distribution of driving-state data items (driving-state data values) collected from the sample vehicles V1 to VM.

In particular, the computer 20a of the server 20 executes the feature distribution storing routine in a predetermined processing period.

In step S10, the server 20 determines whether travelling segments have been defined for the target road. When it is determined that the travelling segments have been defined for the target road (YES in step S10), in other words, when it is determined that a task of adding driving-state data items to the travelling segments is carried out, the feature distribution storing routine proceeds to step S30.

Otherwise, when it is determined that the travelling segments have not been defined for the target road (NO in step S10), the feature distribution storing routine proceeds to step S20. In step S20, the server 20 defines the travelling segments for the target road.

Specifically, as illustrated in FIG. 4, the server 20 identifiers, based on the map information stored in the map DB 26, the target road (see reference characters R1 and R2 in FIG. 4), and divides the identified target road at predetermined intervals, thus defining the travelling segments. Specifically, the target road is comprised of the defined travelling segments. Note that the initially defined travelling segments will also be called initial travelling segments. The predetermined intervals are sufficiently shorter than the lengths of the road links described in the conventional publication, for example, 5 m in length.

In step S20, the server 20 assigns an identifier (ID), i.e. a travelling segment ID, to each of the travelling segments, and stores the travelling segments to which the respective travelling segment identifiers (IDs) are assigned in the travelling segment DB 25.

Referring to FIG. 5, the server 20 generates, in the travelling segment DB 25, a table including
1. The "travelling segment ID"
2. The "range of travelling segment (range)"
3. The "adjacent travelling segment ID (adjacent ID)"
4. The "current feature distribution (distro)", which is a current feature distribution of the corresponding travelling segment
5. The "definition-time distribution", which is a feature distribution at the time of definition
6. The "similarity calculation flag", which will be referred to as flag Fs
7. The "travelling segment ID before division (ID before division)"
8. The "travelling segment ID before combination (ID before combination)"

That is, the server 20 generates a table comprised of records for respective travelling segment IDs. The table illustrated in FIG. 5 can be previously prepared.

The server 20 is configured to
(1) Store, into the field "travelling segment ID" of a record corresponding to each travelling segment, the corresponding travelling segment ID
(2) Store, into the field "range" of a record corresponding to each travelling segment, the latitude and longitude of at least one of a predetermined start point and a predetermined end point (for example, the start point according to the first embodiment) of the corresponding travelling segment
(3) Store, into the field "adjacent ID" of a record corresponding to each travelling segment, the ID of a travelling segment adjacent to the corresponding travelling segment in a predetermined vehicle forward direction or vehicle backward direction (for example, the vehicle forward direction)
(4) Store, into each of the fields "current feature distribution", "definition-time distribution", "ID before division", and "ID before combination", of a record corresponding to each travelling segment, NULL as an initial value
(5) Store, into the field "flag Fs" of a record corresponding to each travelling segment, False as an initial value Specifically, corresponding data values are stored in the fields "travelling segment ID", "range", "adjacent ID", "current feature distribution", "definition-time distribution", "ID before division", "ID before combination", and "flag Fs" of a record corresponding to each travelling segment to be correlated with each other.

NULL represents no data being stored. False represents a value of the similarity calculation flag. If False is stored in the field "flag Fs" of a record of a travelling segment, this represents that there is no need to calculate similarity for the corresponding travelling segment. Such a NULL or False storing process will also be referred to as initialization.

Next, in step S30, the server 20 obtains, in a current cycle of the feature distribution storing routine, the driving-state data items from each of the sample vehicles V1 to VM travelling on travelling segments of the target road. Then, in step S30, the server 20 assigns driving information identifiers (IDs) to the sampled positions of the driving-state data items, which are sampled from the sample vehicles V1 to VM; each of the sampled positions represents a position where the corresponding driving-state data items are sampled, such as the position where the corresponding sample vehicle is travelling. In step S30, the server 20 stores the driving-state data items assigned with the corresponding driving information identifiers (IDs) in the driving information DB 22.

Referring to FIG. 6, the server 20 generates a table including
1. The "driving information ID"
2. The "driving-state data"
3. The "sampled position"
4. The "travelling segment ID"

That is, the server 20 generates a table comprised of records for respective driving information identifiers (IDs). The table illustrated in FIG. 6 can be previously prepared.

The server 20 is configured to
(1) Store a value of the driving information ID assigned to each of the obtained driving-state data items into the field "driving information ID" of a corresponding one of the records
(2) Store each of the driving-state data items to the field "driving-state data" of a corresponding one of the records
(3) Store the latitude and longitude of the sampled position of each of the driving-state data items to the field "sampled position" of a corresponding one of the records
(4) Store NULL into the field "travelling segment ID" of each record as an initial value Specifically, corresponding data values are stored in the fields "driving information ID", "driving-state data", "sampled position", and "travelling segment ID" of a record corresponding to each of the driving-state data items to be correlated with each other.

In step S40, the server 20 performs a travelling segment allocation routine to allocate one of the defined travelling segments to each of the driving-state data items stored in the driving information DB 22. The details of the travelling segment allocation routine will be described later.

In step S50, the server 20 performs a feature distribution estimation routine to estimate, for each of the travelling segments, a distribution, i.e. a current feature distribution, of all of the driving-state data items to each of which a corresponding one of the travelling segments has been allocated, i.e. assigned.

In step S50, when storing the current feature distribution estimated for each travelling segment into the travelling segment DB 25, the server 20 is configured to
(1) Refer to a value of the field "definition-time distribution" of the record of the corresponding travelling segment
(2) Store the corresponding current feature distribution into the field "current feature distribution" and also into the field "definition-time distribution" as a definition-time distribution when the value of the field "definition-time distribution" is NULL
(3) Store the corresponding current feature distribution into the field "current feature distribution" when the value of the field "definition-time distribution" is a value other than NULL The details of the feature distribution estimation routine will be described later.

Next, in step S60, the server 20 performs a similarity calculation routine to
1. Calculate a similarity Sb between the current feature distribution and the definition-time distribution in each traveling segment
2. Calculate a similarity Sa between the current feature distribution in each traveling segment and the current feature distribution of the adjacent travelling segment in the forward direction
3. Store the calculated similarity Sb and similarity Sa for each traveling segment into the similarity DB 30.

The details of the similarity calculation routine will be described later. Note that each of the similarity Sa and similarity Sb corresponds to, for example, a distribution similarity.

Subsequently, in step S70, the server 20 performs a travelling segment division routine to 1. Determine whether to divide at least one travelling segment in all the travelling segments according to the similarity Sb for each travelling segment 2. Divide the at least one travelling segment when determining to divide the at least one travelling segment The details of the travelling segment division routine will be described later.

Next, in step S80, the server 20 performs a travelling segment combination routine to 1. Determine whether to combine at least one pair of travelling segments, which will be referred to as at least one travelling segment pair, in all the travelling segments according to the similarity Sa for each travelling segment 2. Combine the at least one travelling segment pair to generate a single travelling segment when determining to combine the at least one travelling segment pair The details of the travelling segment combination routine will be described later.

In step S90, the server 20 determines whether at least one travelling segment has been divided or combined with another travelling segment in the current cycle of the feature distribution storing routine. When it is determined that no travelling segments have been divided or combined with another travelling segment in the current cycle of the feature distribution storing routine (NO in step S90), the server 20 terminates the feature distribution storing routine.

Otherwise, when it is determined that at least one travelling segment has been divided in the current cycle of the feature distribution storing routine (YES in step S90), the server 20 performs a travelling segment reallocation routine in step S100. The travelling segment reallocation routine reallocates one of the divided travelling segments to each of the driving-state data items in the at least one travelling segment before division.

Otherwise, when it is determined that at least one travelling segment has been combined with another travelling segment in the current cycle of the feature distribution storing routine (YES in step S90), the server 20 performs the travelling segment reallocation routine in step S100. The travelling segment reallocation routine reallocates the combined travelling segment to each of the driving-state data items in the at least one travelling segment. The details of the travelling segment reallocation routine will be described later.

After completion of the operation in step S100, the server 20 returns to step S50, and performs the feature distribution estimation routine to estimate, for each of the reallocated travelling segments, a feature distribution of all of the driving-state data items replaced by a corresponding one of the travelling segments (see step S50). Then, the server 20 stores the estimated current distributions into the travelling segment DB (see step S50).

Next, the server 20 performs, in step S60, the similarity calculation routine to 1. Calculate the similarity Sb between the current feature distribution and the definition-time distribution in each reallocated traveling segment 2. Calculate the similarity Sa between the current feature distribution in each reallocated traveling segment and the current feature distribution of the adjacent reallocated travelling segment in the forward direction 3. Store the calculated similarity Sb and similarity Sa for each reallocated traveling segment into the similarity DB 30.

That is, the server 20 repeatedly performs the sequence of the operations in steps S50 to S100 until the determination in step S90 is NO. For example, when it is determined that no travelling segments have been divided and are combined with another travelling segment at a k-th repetition (k is an integer equal to or more than 1) of the sequence (NO in step S90), the server 20 terminates the feature distribution storing routine.

The above feature distribution storing routine enables the travelling segment DB 25 in which the current feature distribution based on the similar driving-state data items is stored for each travelling segment to be constructed.

The following describes the details of the travelling segment allocation routine, the feature distribution estimation routine, the similarity calculation routine, the travelling segment division routine, the travelling segment combination routine, and the travelling segment reallocation routine in this order.

Travelling Segment Allocation Routine

The following describes the travelling segment allocation routine carried out by the server 20 in step S40 with reference to the flowchart of FIG. 7. The segment allocator 23 of the server 20 performs the travelling segment allocation routine.

In step S110, the segment allocator 23 determines whether a travelling segment is allocated to each of the driving-state data items stored in the driving information DB 22.

As illustrated in FIG. 6, when a travelling segment is not allocated to driving-state data items each having a driving information ID in the driving information DB 22, the initial value is stored in the field "travelling segment ID" of the record corresponding to the driving information ID. That is, the segment allocator 23 determines whether there is at least one record in all the records of the table of the driving information DB 22; the initial value of the field "travelling segment ID" of the at least one record is kept unchanged.

When it is determined that the values of the field "travelling segment ID" of all the records corresponding to all the driving-state data items are updated to another value (YES in step S110), the segment allocator 23 terminates travelling segment allocation routine.

Otherwise, when it is determined that there is at least one record in all the records of the table of the driving information DB 22; the initial value of the field "travelling segment ID" of the at least one record is kept unchanged (NO in step S110), the travelling segment allocation routine proceeds to step S120.

In step S120, the segment allocator 23 extracts a value n, which is an integer equal to or more than 1 and represents a driving-state data item in the driving-state data items sampled in step S30, from the field "driving information ID" of the at least one record. The driving information ID having the value n will be referred to as a driving information identifier (ID)n.

In step S120, the segment allocator 23 extracts, from the travelling segment DB 25, a value i indicative of a value of a travelling segment ID that includes a value stored in the field "sampled position" of each of the driving-state data items of the record corresponding to the extracted driving information IDn.

The driving-state data items corresponding to the extracted driving information IDn will be referred to as driving-state data items dn, and the value stored in the field "sampled position" of each of the driving-state data items dn will be referred to as (long,lat)n. i is an integer equal to or more than 1, and represents a travelling segment in the travelling segments generated in step S20. Note that lat represents latitude, and long represents longitude. That is, in the field "sampled position", the pair of a latitude and a longitude of the sampled position of each driving-state data item is stored.

Specifically, FIG. 5 illustrates that, of the record corresponding to the travelling segment i, a value (long,lat)i is stored in the field "range". That is, the travelling segment i is a segment defined from the start point (long,lat)i to the start point of the next travelling segment j, which is adjacent to the travelling segment i in the vehicle forward direction. In the travelling segment i, the sampled position (long,lat)n of the driving-state data item dn is included.

As illustrated in FIG. 8, the segment allocator 23 updates the field "travelling segment ID" of the record corresponding to the driving information IDn in the driving information DB 22 from the initial value to the value i Hereinafter, when the value of the travelling segment ID is the value i, which is also described as in, the corresponding travelling segment will also be referred to as a travelling segment IDi. In addition, the travelling segment having the travelling segment IDi will be referred to as a travelling segment (IDi).

A current feature distribution has not been estimated for the driving-state data items to which the travelling segment IDi is newly allocated. For this reason, in the following step S130, the segment allocator 23 initializes the field "current feature distribution" of the record corresponding to the travelling segment IDi. Specifically, in the current cycle of the travelling segment allocation routine, the segment allocator 23 initializes the value of the field "current feature distribution" of the record including the travelling segment IDi allocated to the driving-state data item in the travelling segment DB 25.

Thereafter, the segment allocator 23 returns to step S110, and repeatedly performs the operations in steps S110 to S130 until the travelling segments have been allocated to all the driving-state data items.

The above travelling segment allocation routine makes it possible to construct the driving information DB 22 in which values except for the corresponding initial values have been stored in the respective fields "driving-state data", "the sampled position", and "travelling segment ID" for each of the records assigned with the respective driving information identifiers (IDs).

Feature Distribution Estimation Routine

The following describes the feature distribution estimation routine carried out by the server 20 in step S50 with reference to the flowchart of FIG. 9. The feature distribution estimator 24 of the server 20 performs the feature distribution estimation routine.

In step S210, the feature distribution estimator 24 determines whether feature distributions for all the travelling segment IDs have been estimated in the travelling segment DB 25.

As illustrated in FIG. 5, if the current distribution of the driving-state data items for the travelling segment IDi has not been estimated, the initial value of NULL is stored in the field "current feature distribution" of the record corresponding to the travelling segment IDi. Thus, in step S210, the feature distribution determiner 24 determines whether there is a record including a travelling segment ID, in which the initial value has been kept in the field "current feature distribution" of the records constituting the travelling segment DB 25.

When it is determined that the fields "current feature distribution" in all the records corresponding to all the travelling segment IDs have been updated from the initial values to values other than the corresponding initial values (YES in step S210), the feature distribution estimator 24 terminates the feature distribution estimation routine.

Otherwise, when it is determined that the filed "current feature distribution" in a record corresponding to a travelling segment ID has been kept unchanged to the initial value (NO in step S210), the feature distribution estimator 24 extracts a value i, which is the value of the travelling segment ID in step S220.

Then, in step S220, the feature distribution estimator 24 extracts, from the driving information DB 22, all the driving-state data items dn corresponding to the travelling segment IDi.

Next, in step S230, the feature distribution estimator 24 estimates a current feature distribution Pi that represents the distribution of all the extracted driving-state data items dn in the travelling segment (IDi) using an estimation method selected in known estimation methods (see FIG. 10). Note that the current feature distribution Pi representing the distribution of the driving-state data items dn will also be referred to as a current feature distribution Pi(d).

Note that FIG. 10 illustrates, as an example, the two-dimensional distribution of all the driving-state data items dn in the travelling segment (IDi).

The known methods include

1. The method of estimating the current feature distribution Pi that represents the distribution of all the extracted driving-state data items dn in the travelling segment (IDi) using a probability distribution, such as a Gaussian Mixture Model or a Dirichlet distribution 2. The method of estimating, as one or more parameters indicative of the current feature distribution Pi that represents the distribution of all the driving-state data items dn, at least one of representative values including an average value, a median value, a maximum value, a minimum value, and other similar values.

In step S230, when the current feature distribution Pi of all the extracted driving-state data items dn corresponding to the travelling segment (IDi) has been obtained, the feature distribution estimator 24 updates the field "current feature distribution" of the record corresponding to the travelling segment (IDi) from the initial value (NULL) to the current feature distribution Pi.

In step S230, if the initial value of NULL is also stored in the field "definition-time distribution" of the record corresponding to the travelling segment (IDi) in the travelling segment DB 25, the feature distribution estimator 24 stores, into the field "definition-time distribution", the current feature distribution Pi as a definition-time distribution Pio.

Specifically, when the travelling segment IDi is defined in the current cycle of the feature distribution storing routine, the initial value of NULL is stored in each of the fields "current feature distribution" and "definition-time distribution" of the record corresponding to the travelling segment (IDi) in the travelling segment DB 25.

For this reason, the feature distribution estimator 24 stores the estimated current feature distribution Pi into each of the fields "current feature distribution" and "definition-time distribution" of the record corresponding to the travelling segment (IDi) in the travelling segment DB. This updates each of the fields "current feature distribution" and "definition-time distribution" from the corresponding initial value to the current feature distribution Pi.

On the other hand, when the travelling segment IDi is not defined in the current cycle of the feature distribution storing routine, i.e. when driving-state data items are added to the record corresponding to the defined travelling segment IDi, a value other than the initial value of NULL is stored in the field "definition-time distribution" of the record corresponding to the travelling segment (IDi) in the travelling segment DB 25. For this reason, the feature distribution estimator 24 stores, into the field "current feature distribution" of the record corresponding to the travelling segment (IDi), the current feature distribution Pi. This updates the field "current feature distribution" from the corresponding initial value to the current feature distribution Pi.

Note that, in FIG. 11, in the field "definition-time distribution" of the record corresponding to the travelling segment (IDi), a definition-time distribution Pi0, which is different from the current feature distribution Pi, is stored.

In step S230, the similarity Sa and similarity Sb for the travelling candidate IDi to which the current feature distribution Pi has been estimated are not calculated. Thus, in step S240, the feature distribution estimator 24 updates the field "flag Fs" of the record corresponding to the travelling segment (IDi) in the travelling segment DB 25 from the initial value False to value True. Note that, if True is stored in the field "flag Fs" of a record of a travelling segment, this represents that there is need to calculate similarity for the corresponding travelling segment.

Thereafter, the feature distribution estimator 24 returns to step S210, and repeatedly performs the sequence of the operations in steps S210 to S240 until the current feature distributions have been estimated for all the records corresponding to all the travelling segment IDs.

The above feature distribution estimation routine makes it possible to construct the travelling segment DB 25 in which values except for the corresponding initial values have been stored in the respective fields "range", "adjacent ID", "current feature distribution", and "definition-time distribution" for each of the records assigned with the respective driving information identifiers (IDs).

Similarity Calculation Routine

The following describes the similarity calculation routine carried out by the server 20 in step S60 with reference to the flowchart of FIG. 12. The similarity calculator 28 of the server 20 performs the similarity calculation routine.

In step S310, the similarity calculator 28 determines whether False has been stored in each of the fields "Fs" of all the records corresponding to all the travelling segment IDs in the travelling segment DB 25.

When it is determined that False has been stored in each of the fields "Fs" of all the records corresponding to all the travelling segment IDs (YES in step S310), the similarity calculator 28 terminates the similarity calculation routine.

Otherwise, when it is determined that True has been stored in the field "Fs" of the record corresponding to travelling segment ID (NO in step S310), the similarity calculator 28 extracts, from the corresponding record, a value i, which is the value of the corresponding travelling segment ID in step S320.

Then, in step S320, the similarity calculator 28 refers to the value j, which is also described as {j}i, of the field "adjacent ID" of the record corresponding to the travelling segment IDi, thus extracting the current feature distribution stored in the field "current feature distribution" of the record corresponding to the travelling segment IDj. The current feature distribution extracted from the field "current feature distribution" of the record corresponding to the travelling segment IDj will be referred to as a current feature distribution Pj.

Next, in step S330, the similarity calculator 28 calculates a similarity, i.e. a distribution similarity, between the current feature distribution Pi and the current feature distribution Pj; the similarity will be referred to as a similarity Sa(Pi, Pj).

Then, as illustrated in FIG. 13, the similarity calculator 28 stores, into the similarity DB 30, the calculated distribution similarity Sa(Pi, Pj) to be correlated with the travelling-segment pair (i,j).

In step S330, the similarity calculator 28 can calculate, as the distribution similarity Sa(Pi, Pj), a sigmoid function value of known Kullback-Leibler information as an example.

For example, the similarity calculator 28 calculates the Kullback-Leibler information $D_{KL}(Pi\|Pj)$, which is a measure of the divergence between the current feature distributions Pi and Pj, using the following equation (1):

$$D_{KL}(Pi \| Pj) = \int Pi(d) \log \frac{Pi(d)}{Pj(d)} dd \qquad (1)$$

Then, the similarity calculator 28 calculates the sigmoid function value S(Pi, Pj) of the Kullback-Leibler information $D_{KL}(Pi\|Pj)$ in accordance with the following equation (2)

$$S(Pi, Pj) = \frac{1}{1 + \exp(-D_{KL}(Pi \| Pj))} \qquad (2)$$

Next, in step S340, the similarity calculator 28 calculates a distribution similarity Sb(Pi, Pio) between the current feature distribution Pi of the record corresponding to the travelling segment IDj and the definition-time distribution Pio in the same manner as the operation in step S330. Then, as illustrated in FIG. 13, the similarity calculator 28 stores, into the similarity DB 30, the calculated distribution similarity Sb (Pi, Pio) to be correlated with the travelling segment pair (i,j).

Next, in step S350, the similarity calculator 28 changes the field "flag Fs" of the record corresponding to the travelling segment IDi from True to False.

Thereafter, the similarity calculator 28 returns to step S310, and repeatedly performs the sequence of the operations in steps S310 to S350 until the values of the fields "flag Fs" of the records corresponding to all the travelling segments have been changed to False.

The above similarity calculation routine makes it possible to construct the similarity DB 30 in which the similarity Sa and the similarity Sb for each of the travelling segments ID has been stored.

Travelling Segment Division Routine

The following describes the travelling segment division routine carried out by the server 20 in step S70 with reference to the flowchart of FIG. 14. The segment changer 29 of the server 20 performs the travelling segment division routine.

In step S410, the segment changer 29 determines whether all the travelling segments have been checked for their necessity of division.

Referring to FIG. 15, the definition-time distribution Pio at the time of defining the travelling segment IDi is configured such that values of the respective driving-state data items in the travelling segment IDi are similar to each other. In contrast, addition of values of driving-state data items to the definition-time distribution Pio may result in there being differences among some of the driving-state data items in the travelling segment IDi. This may result in the feature distribution of the travelling segment IDi being changed from the definition-time distribution Pio. Specifically, the current feature distribution Pi of the travelling segment IDi is changed from the definition-time distribution Pio.

Note that, in FIG. 15, the definition-time distribution Pio is illustrated as Pio(d), and the current feature distribution Pi is illustrated as Pi(d).

For addressing such a case, the segment changer 29 divides the travelling segment IDi in accordance with the change of similarity of the current feature distribution Pi relative to the definition-time distribution Pio.

Specifically, when it is determined that all the travelling segments have been checked about their necessity of division (YES in step S410), the segment changer 29 terminates the travelling segment change routine.

Otherwise, when it is determined that a travelling segment, i.e. a travelling segment ID, has not been checked about its necessity of division (NO in step S410), the segment changer 29 extracts a value i, which is the value of the corresponding travelling segment ID in step S420.

Then, in step S420, the segment changer 29 refers to the similarity DB 30 to determine whether the distribution similarity Sb(Pi, Pio) corresponding to the travelling segment IDi is equal to or more than a predetermined division threshold Sthb. Note that a value of the division threshold Sthb is set such that, when the distribution similarity Sb(Pi, Pio) is equal to or more than the division threshold Sthb, the feature distribution Pi and the feature distribution Pio are similar to each other.

When it is determined that the distribution similarity Sb(Pi, Pio) corresponding to the travelling segment IDi is equal to or more than the division threshold Sthb (YES in step S420), the segment changer 29 determines that there is no need to divide the travelling segment IDi. This is because the feature distribution Pi and the feature distribution Pio can be interpreted to be similar to each other. Then, the segment changer 29 returns to step S410, and repeatedly performs the operations from step S410.

Otherwise, when it is determined that the distribution similarity Sb(Pi, Pio) is less than the division threshold Sthb (NO in step S420), the segment changer 29 determines that there is need to divide the travelling segment IDi. This is because the feature distribution Pi and the feature distribution Pio cannot be interpreted to be similar to each other. Then, the travelling segment division routine proceeds to step S430.

In step S430, the segment changer 29 divides the travelling segment IDi to define first and second division travelling segments.

Specifically, if adjacent first and second division travelling segments defined in step S20 were combined with each other as a combination travelling segment in a previous cycle of the feature distribution storing routine, which was carried out previous to the current cycle of the feature distribution storing routine, the segment changer 29 can divide the combination travelling segment into the first and second division travelling segments in step S430.

In addition, the segment changer 29 can divide a travelling segment defined in step S20 into shorter segments to satisfy a predetermined threshold of distribution cohesion. The distribution cohesion represents a digitized value of how driving-state data items are dense to each other in a travelling segment. Specifically, a value of the distribution cohesion of the driving-state data items in each of the travelling segments divided in step S430 is equal to or more than the threshold of the distribution cohesion, so that the driving-state data items are sufficiently dense to each other.

In this case, the segment changer 29 can try to divide the travelling segment IDi at several points, i.e. several points of latitude and longitude, in the travelling segment IDi, and selects one of the points where the driving-state data items included in each of the divided travelling segments at the selected point has a value of the distribution cohesion, which is equal to or more than the threshold of the distribution cohesion.

In step S430, for each of the first and second division segments generated by the division of the travelling segment IDi, the segment changer 29 is configured to 1. Store a corresponding one of travelling segment IDs ia and ib into the field "travelling segment ID" of the corresponding record 2. Store a corresponding one of the first set of the latitude and longitude of the start point of the travelling segment ia, which is expressed as (long,lat)ia, and the second set of the latitude and longitude of the start point of the travelling segment ib, which is expressed as (long,lat)ib into the field "range" of the corresponding record.

3. Store a corresponding one of the ID {j}ia of a travelling segment adjacent to the travelling segment IDia in the predetermined vehicle forward direction and the ID {j}ib of a travelling segment adjacent to the travelling segment IDia in the predetermined vehicle forward direction into the field "adjacent ID" of the corresponding record 4. Store NULL into each of the fields "current feature distribution" and "definition-time distribution" of the corresponding record 5. Store NULL into the field "ID before combination" of the corresponding record 6. Store False into the field "flag Fs" of the corresponding record 7. Store The value i into the field "ID before division" of the corresponding record Next, in step S440, the segment changer 29 deletes, from the travelling segment DB 25, information about the travelling segment IDi before division, i.e. the corresponding record.

Thereafter, the segment changer 29 returns to step S410, and repeatedly performs the sequence of the operations in steps S410 to S440 until it is determined that all the travelling segments have been checked about their necessity of division.

That is, the above travelling segment division routine is configured to

1. Divide at least one travelling segment, whose current feature distribution has been changed from the definition-time distribution due to differences in values of driving-state data items between these distributions, into first and second division travelling segments 2. Generate a record for each of the first and second division traveling segments This makes it possible to construct the travelling segment DB 25 having the records for the respective first and second division travelling segments.

Travelling Segment Combination Routine

The following describes the travelling segment combination routine carried out by the server 20 in step S80 with reference to the flowchart of FIG. 17. The segment changer 29 of the server 20 performs the travelling segment combination routine.

In step S510, the segment changer 29 determines whether all pairs of travelling segments, which have not been divided in above step S70, have been checked about their probability of combination in the travelling segment DB 25.

For example, if the target road is a monotonous road, such as a highway, plural travelling segments, such as adjacent travelling segments, defined in step S20 can be interpreted to be similar to each other. In this case, if the feature distribution of one of the plural travelling segments is stored, it is possible to use the stored feature distribution as the feature distribution of another one of the plural travelling segments while maintaining the accuracies of the feature distributions of the respective plural travelling segments.

In the first embodiment, sharing the feature distribution of one of the plural travelling segments, which are interpreted to be similar to each other, as the feature distribution of each of the other plural travelling segments is defined as integrating the plural segments.

Specifically, integrating plural travelling segments whose values of the driving-state data items of them are similar to each other enables the travelling segment DB 25 to be more efficient while maintaining the accuracy of the feature distribution of each of the plural travelling segments.

In view of the above background, in step S510, the segment changer 29 determines whether all pairs of travelling segments, which have not been divided in above step S70, have been checked about their probability of combination in the travelling segment DB 25.

At that time, values of the driving-state data items of one of the division travelling segments, which are divided in step S70, are not interpreted to be similar to values of the driving-state data items of the other thereof. For this reason, the segment changer 29 does not check at least one pair of travelling segments, whose fields "ID before division" of their records have stored values except for their initial values, about their probability of combination.

When it is determined that all pairs of travelling segments, which have not been divided in above step S70, have been checked about their probability of combination in the travelling segment DB 25 (YES in step S510), the segment changer 29 terminates the segment combination routine.

Otherwise, when it is determined that a pair of travelling segments, i.e. a travelling segment pair, which have not been divided in above step S70, have not been checked about their probability of combination in the travelling segment DB 25 (NO in step S510), the segment changer 29 extracts a pair (i, j), i.e. a travelling-segment ID pair (i, j), of the travelling segment pair. Then, the travelling segment combination routine proceeds to step S520. Note that, as described above, a travelling segment pair extracted in step S510 according to the first embodiment is comprised of a travelling segment having a travelling segment ID of i and a travelling segment, which is adjacent to the travelling segment with the travelling segment ID of i, having a travelling segment ID of j.

In step S520, the segment changer 29 determines whether there is a probability that ranges of the travelling-segment ID pair (i, j) are combined.

Specifically, the segment changer 29 refers to the similarity DB 30 to read the distribution similarity Sa(Pi, Pj) of the travelling-segment ID pair (i, j) therefrom, and determines whether the distribution similarity Sa(Pi, Pj) is less than a predetermined combination threshold Stha. Note that a value of the combination threshold Stha is set such that, when the distribution similarity Sa(Pi, Pj) is equal to or more than the division threshold Stha, the feature distribution Pi and the feature distribution Pj are similar to each other. The combination threshold Stha can be set to be equal to or different from the division threshold Sthb.

When it is determined that the distribution similarity Sa(Pi, Pj) is less than the combination threshold Stha (YES in step S520), the segment changer 29 determines that the travelling segment pair corresponding to the travelling-segment ID pair (i, j) cannot be combined, returning to step S510.

Otherwise, when it is determined that the distribution similarity Sa(Pi, Pj) is equal to or more than the combination threshold Stha (NO in step S520), the segment changer 29 determines that the travelling segment pair corresponding to the travelling-segment ID pair (i, j), can be combined. Then, the travelling segment combination routine proceeds to step S530.

In step S530, if there is a travelling segment (IDk), which is adjacent to the travelling segment (IDj) in the vehicle forward direction, in other words, the travelling segments (IDi), (IDj), and (IDk) are sequentially arranged, the segment changer 29 determines whether the similarity Sa(Pj, Pk) of the travelling-segment ID pair (j, k) is higher than the similarity Sa(Pi, Pj) of the travelling-segment ID pair (i, J. Note that reference character Pk represents the feature distribution of the travelling segment (IDk).

Specifically, there is a case where both the similarity Sa(Pi, Pj) and the similarity Sa(Pj, Pk) are higher than the combination threshold Stha, but the similarity Sa(Pi, Pk) is lower than the combination threshold Stha. In this case, if the range of the travelling-segment ID pair (i, j) and the range of the travelling-segment ID pair (j, k) were combined with each other, the range of the travelling segment (IDi) and the range of the travelling segment (IDk), which are not similar in driving-state data to each other, would be combined with each other.

From this viewpoint, when it is determined that the similarity Sa(Pj, Pk) is higher than the similarity Sa(Pi, Pj) (YES in step S530), the segment changer 29 determines that there is a probability that the similarity Sa(Pi, Pk) is lower than the combination threshold Stha even if both the similarity Sa(Pi, Pj) and the similarity Sa(Pj, Pk) are higher than the combination threshold Stha. Then, the segment changer 29 returns to step S510.

Otherwise, when it is determined that the similarity Sa(Pi, Pj) is equal to or higher than the similarity Sa(Pj, Pk), the travelling segment combination routine proceeds to step S540.

In step S540, the segment changer 29 combines the ranges of the travelling-segment ID pair (i, j) with each other to define a new travelling segment, and assigns a value ic for as the value of the travelling segment ID to the combined travelling segment.

Then, for the record of the combined travelling segment, the segment changer 29 is configured to 1. Store, into the field "travelling segment ID", the travelling segment ID (ic)

2. Store, into the field "range", the latitude and longitude of the start point of the combined travelling segment 3. Store, into the field "adjacent ID", the travelling segment ID (k) that is adjacent to the travelling segment ID (k) in the vehicle forward direction 4. Store, into each of the fields "current feature distribution" and "definition-time distribution", NULL, because no current feature distribution and definition-time distribution are obtained 5. Store, into the field "flag Fs", False as an initial value 6. Store, into the field "flag Fs", False 7. Store, into the field "ID before combination", the corresponding travelling-segment ID pair (i, j)

Next, in step S550, the segment changer 29 deletes, from the travelling segment DB 25, information about the travelling-segment ID pair (i, j), i.e. the corresponding records for the respective travelling segment IDi and travelling segment IDj.

Thereafter, the segment changer 29 returns to step S510, and repeatedly performs the sequence of the operations in steps S510 to S550 until it is determined that all the travelling segments have been checked about their probability of combination, i.e. until the determination in step S510 is affirmative.

The above travelling segment combination routine enables, in the sequential travelling segments (IDi1) to (IDi8), (1) The ranges of the travelling-segment ID pair (i3, i4), whose similarity Sa is equal to or higher than the threshold Stha, to be combined to a travelling segment (IDi34)

(2) The ranges of the travelling-segment ID pair (i6, i7), whose similarity Sa is equal to or higher than the threshold Stha, to be combined to a travelling segment (IDi67)

The above travelling segment combination routine therefore also enables (1) Pieces of information for the travelling segment (IDi34) to be stored in the fields of the record corresponding to the travelling segment (IDi34) in the travelling segment DB 25

(2) Pieces of information for the travelling segment (IDi67) to be stored in the fields of the record corresponding to the travelling segment (IDi67) in the travelling segment DB 25

Travelling Segment Reallocation Routine

The following describes the travelling segment reallocation routine carried out by the server 20 in step S100 with reference to the flowcharts of FIGS. 20 to 22. The segment allocator 23 of the server 20 performs the travelling segment reallocation routine.

In step S610 of FIG. 20, if a travelling segment is divided into first and second travelling segments, the segment allocator 23 performs a division segment allocation routine that allocates the divided first and second division travelling sections to the driving-state data items included in the travelling section before division.

Specifically, as illustrated in FIG. 21, the segment allocator 23 refers to the travelling segment DB 25 to thereby determine whether the value of the field "ID before division" of the record of each of all the travelling segments is the corresponding initial value in step S710.

As described below, the field "ID before division" of the record of a travelling segment is initialized when travelling segments after division are allocated to the driving-state data items included in the travelling segment (see step S740). For this reason, when it is determined that the value of the field "ID before division" of the record of each of all the travelling segments is the corresponding initial value (YES in step S710), the segment allocator 23 terminates the division segment allocation routine. Then, the travelling segment reallocation routine proceeds to step S620.

Otherwise, when it is determined that the value of the field "ID before division" of each of records is not the corresponding initial value (NO in step S710), the segment allocator 23 extracts the records from the travelling segment DB 25, and also extracts a value i in the field "ID before division" of each of the extracted records in step S720.

In step S720, the segment allocator 23 extracts, from the driving information DB 22, all the driving information identifiers (IDn) each having the travelling segment ID of the extracted value i. The extracted driving information identifiers (IDn) respectively correspond to the driving-state data items included in the travelling data segment (IDi) before division.

Next, in step S730, the segment allocator 23 extracts, from the travelling segment DB 25, values in of travelling segment IDs, the range of each of which includes the value of the field "sampled position" of a corresponding one of the extracted driving information identifiers (IDn). Then, the segment allocator 23 allocates, to the field "travelling segment ID" of the record of each of the extracted driving information identifiers (IDn), a corresponding one of the extracted values ia. Each of the values in represents the ID of a corresponding one of the divided travelling segments (IDia).

Specifically, each of the travelling segments (IDia) after division is allocated to a corresponding one of the driving-state data items included in the travelling segment (IDi) before division.

In step S730, the segment allocator 23 changes the field "travelling segment ID" of the record corresponding to each of the driving information identifiers (IDn) from a corresponding one of the values i to a corresponding one of the values ia in the driving information DB 22

Subsequently, in step S740, the segment allocator 23 changes the field "ID before division" of each of the records extracted in step S720 from the value i to the initial value.

Thereafter, the segment allocator 23 returns to step S710, and repeatedly performs the sequence of the operations in steps S710 to S740 until the value of the field "ID before division" of the record of each of all the travelling segments is the corresponding initial value, i.e. has been changed to the initial value in step S710.

That is, when the value of the field "ID before division" of the record of each of all the travelling segments has been changed to the initial value (YES in step S710), the segment allocator 23 terminates the division segment allocation routine. Thereafter, the travelling segment reallocation routine proceeds to step S620.

The above division segment allocation routine makes it possible to construct the driving information DB 22 in which the travelling segment IDs after division have been allocated to the respective driving-state data items.

In step S620 of FIG. 20, if a travelling segment pair is combined with a travelling segment, the segment allocator 23 performs a combination segment allocation routine that allocates a travelling segment after combination to each of the driving-state data items in the travelling segment pair.

Specifically, as illustrated in FIG. 22, the segment allocator 23 refers to the travelling segment DB 25 to thereby determine whether the value of the field "ID before combination" of the record of each of all the travelling segments is the corresponding initial value in step S810.

As described below, the field "ID before combination" of the record of a travelling segment is initialized when a travelling segment after combination is allocated to the driving-state data items included in the travelling segment (see step S840). For this reason, when it is determined that the value of the field "ID before combination" of the record of each of all the travelling segments is the corresponding initial value (YES in step S810), the segment allocator 23 terminates the combination segment allocation routine, i.e.

the travelling segment reallocation routine. Then, the feature distribution storing routine proceeds to step S50.

Otherwise, when it is determined that the value of the field "ID before combination" of a record is not the corresponding initial value (NO in step S810), the segment allocator 23 extracts the record from the travelling segment DB 25, and also extracts a travelling-segment pair (i,j), in the field "ID before combination" of the extracted record in step S820.

In step S820, the segment allocator 23 extracts, from the driving information DB 22, all the driving information identifiers (IDn) each having the travelling segment ID of the extracted travelling segment pair (i, j). The extracted driving information identifiers (IDn) respectively correspond to the driving-state data items included in the travelling-data segment pair (i, j) before combination.

Next, in step S830, the segment allocator 23 extracts, from the travelling segment DB 25, a value ic of the travelling segment ID whose range includes the value of the field "sampled position" of each of the extracted driving information identifiers (IDn). Then, the segment allocator 23 allocates, to the field "travelling segment ID" of the record of each of the extracted driving information identifiers (IDn), the extracted value ic. The value ic represents the ID of the combined travelling segment (IDic).

Specifically, the travelling segment (IDic) after combination is allocated to each of the driving-state data items included in the travelling segment (IDi) before combination.

In step S830, the segment allocator 23 changes the field "travelling segment ID" of the record corresponding to each of the driving information identifiers (IDn) from a corresponding one of the values i to the value ic in the driving information DB 22

Subsequently, in step S840, the segment allocator 23 changes the field "ID before combination" of each of the records extracted in step S820 from the value i to the initial value.

Thereafter, the segment allocator 23 returns to step S810, and repeatedly performs the sequence of the operations in steps S810 to S840 until the value of the field "ID before combination" of the record of each of all the travelling segments is the corresponding initial value, i.e. has been changed to the initial value in step S810.

That is, when the value of the field "ID before combination" of the record of each of all the travelling segments has been changed to the initial value (YES in step S810), the segment allocator 23 terminates the combination segment allocation routine, i.e. the travelling segment reallocation routine. Thereafter, the server 20 returns to step S50.

The above combination segment allocation routine makes it possible to construct the driving information DB 22 in which the travelling segment IDs after combination have been allocated to the respective driving-state data items.

In step S50, the server 20 performs the feature distribution estimation routine to estimate, for each of the reallocated travelling segments, a feature distribution of all of the driving-state data items replaced by a corresponding one of the travelling segments (see step S50). Then, the server 20 stores the estimated current distributions into the travelling segment DB (see step S50).

Next, the server 20 performs the similarity calculation routine to
1. Calculate the similarity Sb between the current feature distribution and the definition-time distribution in each reallocated traveling segment
2. Calculate the similarity Sa between the current feature distribution in each reallocated traveling segment and the current feature distribution of the adjacent reallocated travelling segment in the forward direction
3. Store the calculated similarity Sb and similarity Sa for each reallocated traveling segment into the similarity DB 30.

That is, the server 20 repeatedly performs the sequence of the operations in steps S50 to S100 until the determination in step S90 is NO. For example, when it is determined that no travelling segments have been divided or have been combined with another travelling segment at a k-th repetition (k is an integer equal to or more than 1) of the sequence (NO in step S90), the server 20 terminates the feature distribution storing routine.

Advantageous Effects

The first embodiment described above achieves the following advantageous effects.

The server 20 stores, into the travelling segment DB 25, a feature distribution of similar driving-state data items for each travelling segment in which the similar driving-state data items are included. For this reason, this achieves the first advantageous effect of enabling the travelling segment DB 25 storing the driving-state data items with higher accuracy to be constructed as compared with a conventional DB in which dissimilar driving-state data items are stored for each road link.

The server 20 combines different travelling segments with each other to define a combined travelling segment if the similarity Sa between the current feature distributions of the respective different travelling segments is higher than the combination threshold Stha. Then, the server 20 stores, into the travelling segment DB 25, the feature distribution of the combined driving-state data items. Specifically, it is possible to store, in the travelling segment DB 25, the feature distribution of the combined travelling segment without storing, in the travelling segment DB 25, the individual feature distributions of the different travelling segments. This achieves the second advantageous effect of resulting in reduction of both the number of travelling segments and the number of driving-state data items stored in the travelling segment DB 25, thus making the travelling segment DB more efficient.

The server 20 combines plural travelling segments, whose ranges are continuous and whose feature distributions are similar to each other, with each other to define a single combined travelling segment. This achieves the third advantageous effect of enabling the combined travelling segment to be efficiently handled.

The server 20 divides a travelling segment in accordance with change of the feature distribution of the travelling segment into first and second division travelling segments. Then, the server 20 sets the driving-state data items in the first division travelling segment and the driving-state data items in the second division travelling segment to be similar to each other. This achieves the fourth advantageous effect of making it possible to, if the shape of the feature distribution of a travelling segment is changed due to an increase of values of driving-state data items in the travelling segment, construct the travelling segment DB 25 storing the feature distributions for the respective travelling segments, each of which includes similar driving-state data items.

The server 20 calculates, for each travelling segment, the similarity between
(1) The definition-time distribution being a distribution of driving-state data items at the definition of the corresponding travelling segment (2) The current feature distribution being a distribution of driving-state data items when additional driving-state data item(s) are collected to be added to the corresponding travelling segment after the definition of the corresponding travelling segment This achieves the fifth advantageous effect of making it possible to determine whether the uniformity of the current feature distribution of each travelling segment is reduced due to an increase of values of the driving-state data items to the corresponding travelling segment. If it is determined that the uniformity of the current feature distribution of a travelling segment is reduced, the server 20 divides the traveling segment into plural driving segments, enabling travelling segments in each of which similar driving-state data items are included to be redefined.

The server 20 is configured to not combine, at one time, a first travelling segment, a second travelling segment, which is adjacent thereto in the direction opposite to the vehicle forward direction, and a third travelling segment, which is adjacent to the first travelling segment in the vehicle forward direction with each other even if (1) The first similarity between the first current feature distribution of the first travelling segment and the second current feature distribution of the second travelling segment is higher than the combination threshold Stha (2) The second similarity between the first current feature distribution of the first travelling segment and the third current feature distribution of the third travelling segment is higher than the combination threshold Stha This configuration achieves the sixth advantageous effect of preventing dissimilar travelling segments from being combined with each other.

When a target travelling segment is divided into first and second division travelling segments, the server 20 achieves the seventh advantageous effect of allocating each of the driving-state data items included in the target travelling segment to one of the division first and second travelling segments in accordance with the sampled position of the corresponding one of the driving-state data items.

The server 20 is configured to collect the sample vehicles V1 to VM travelling on the target road on the map. This configuration achieves the eighth advantageous effect that merely divides the target road into travelling segments enables the travelling segments to be easily defined.

Simulation Result

The server 20 according to the first embodiment run a simulation to construct the travelling segment DB 25 for a target road RO. In FIG. 23, the boundaries between different hatchings each show boundaries between plural travelling segments in the travelling segment DB 25.

Specifically, around each of the intersections IS, there are finely divided travelling segments, and each of the finely divided travelling segments is narrower than the travelling segments around other places except for the intersections IS. In particular, at a relatively monotonous straight portion in the target road RO, travelling segment have been combined to define a wider travelling segment.

Specifically, as compared with road links between the intersections IS of the target road RO, each of the travelling segments stored in the travelling segment DB 25 is configured such that the driving-state data items in the corresponding one of the travelling segments are similar to one another. This configuration makes it possible to construct the travelling segment DB 25 storing driving-state data items with higher accuracy as compared with a conventional DB in which dissimilar driving-state data items are stored for each road link.

Accordingly, it is possible to assist the assisted vehicle 50 using the driving-state data distribution for each travelling segment with higher accuracy as compared with a conventional system that assists the assisted vehicle 50 using driving-state data items corresponding to each road link.

Second Embodiment

Different Point Relative to First Embodiment

Because the basic structure of the second embodiment is identical to the structure of the first embodiment, the following mainly describes the different points of the second embodiment as compared with the first embodiment, and omits or simplifies descriptions of common parts between the first and second embodiments. Because reference characters used in the second embodiment, which are identical to reference characters used in the first embodiment, respectively represent common parts, the following refers to the above descriptions of the common parts.

The server 20 of the first embodiment calculates the similarity Sa between the feature distributions of respective different travelling segments.

FIG. 24 illustrates the number of driving-state data items sampled, i.e. collected, for each of different travelling segments A, B, and C. As illustrated in FIG. 24, the sampled number of values of driving-state data items collected for the travelling segment C is smaller than each of the sampled number of values of driving-state data items collected for the travelling segment A and the sampled number of values of driving-state data items collected for the travelling segment B. In this case, it may be difficult to estimate the feature distribution for the travelling segment C with high accuracy. This may therefore result in difficulty of calculating the similarity Sa between the feature distribution for the travelling segment A or B and the feature distribution for the travelling segment C.

From this viewpoint, a server 20A according to the second embodiment does not estimate the feature distribution for a travelling segment whose sampled number of values of driving-state data items is insufficient, but calculates a similarity of a value of each driving-state data item with respect to the current feature distribution for another traveling segment.

Referring to FIG. 25, the server 20A further includes a determiner 31 in addition to all the functions of the first embodiment. The following describes a feature distribution storing routine that stores a driving-state data distribution, i.e. a driving-state feature distribution, for each of travelling segments of a target road to be carried out by the server 20A. In particular, the following describes different points of the feature distribution storing routine from the feature distribution storing routine according to the first embodiment with reference to the flowchart of FIG. 26.

In particular, the computer 20a of the server 20A executes the feature distribution storing routine in a predetermined processing period.

In step S15, the server 20A determines whether travelling segments have been defined for the target road, which is similar to the operation in step S10.

When it is determined that the travelling segments have been defined for the target road (YES in step S15), the feature distribution storing routine proceeds to step S35. Otherwise, when it is determined that the travelling segments have not been defined for the target road (NO in step S15), the feature distribution storing routine proceeds to step S25. In step S25, the server 20A defines the travelling segments for the target road in the same manner as step S20.

In step S25, the server 20A assigns an ID, i.e. a travelling segment ID, to each of the travelling segments, and stores the travelling segments to which the respective travelling segment identifiers (IDs) are assigned in the travelling segment DB 25.

Referring to FIG. 27, the server 20A generates, in the travelling segment DB 25, a table including 1. The "travelling segment ID"
2. The "range of travelling segment (range)"
3. The "adjacent travelling segment ID (adjacent ID)"
4. The "current feature distribution (distro)", which is a current feature distribution of the corresponding travelling segment
5. The "definition-time distribution", which is a feature distribution at the time of definition
6. The "similarity calculation flag", which will be referred to as flag Fs
7. The "travelling segment ID before division (ID before division)"
8. The "travelling segment ID before combination (ID before combination)"
9. The "sample sufficiency level"
10. The "average log-likelihood"

That is, as compared with FIG. 5 according to the first embodiment, the record for each travelling segment newly includes the "sample sufficiency level" and the "average log-likelihood".

In step S25, the server 20A respectively stores, into the fields "travelling segment ID", "range", "adjacent ID", "current feature distribution", "definition-time distribution", "ID before division", "ID before combination", and "flag Fs" of a record corresponding to each travelling segment, the corresponding values similar to the values of the first embodiment. In step S25, the server 20A also stores, into each of the fields "sample sufficiency level" and "average log-likelihood" of a record corresponding to each travelling segment, NULL as an initial value.

Subsequently, in step S35, the server 20A obtains the driving-state data items from each of the sample vehicles V1 to VM, which is similar to step S30, and assigns driving information IDs to the sampled positions of the driving-state data items. In step S35, the server 20A stores the driving-state data items assigned with the corresponding driving information IDs into the driving information DB 22.

In step S45, the server 20A allocates one of the defined travelling segments to each of the driving-state data items stored in the driving information DB 22 in the same manner as step S40.

Following the operation in step S45, the server 20A determines whether the number, i.e. sampled number, of values of driving-state data items sampled for each travelling segment is sufficient to calculate the feature distribution for the corresponding travelling segment in step S55. That is, in step S55, the server 20A determines whether the number, i.e. sampled number, of values of driving-state data items sampled for each travelling segment is sufficient to calculate the similarity Sa to the feature distribution for another travelling segment. The determiner 31 of the server 20A performs the operation in step S55.

For example, the server 20A calculates a sample sufficiency level SS for each travelling segment; the sample sufficiency level SS for each travelling segment is an indicator representing whether the sampled number of driving-state data items for the corresponding travelling segment is sufficient. Then, the server 20A determines whether the calculated sample sufficiency level SS for each travelling segment is greater than a predetermined threshold, and determines that the sampled number of driving-state data items for each travelling segment is sufficient upon determination that the calculated sample sufficiency level SS for the corresponding travelling segment is greater than the predetermined threshold.

Note that the server 20A can use the sampled number of driving-state data items as the sample sufficiency level SS. As another example, the server 20A can calculate, based on the sampled number of driving-state data items for each travelling segment, the sample sufficiency level SS for the corresponding travelling segment using known cross validation.

When calculating the sample sufficiency level SS for a target travelling segment using the sampled number of driving-state data items, the server 20A divides the sampled driving-state data items corresponding to the target travelling segment into N clusters. N is a natural number equal to or more than 2 and equal to or less than the total sampled number of the driving-state data items corresponding to the target travelling segment.

Next, the server 20A removes one cluster from the N clusters, and performs an estimation task to estimate, from the remaining (N−1) clusters, a feature distribution of the (N−1) clusters of the driving-state data items.

Then, the server 20A performs a calculation task that (1) Calculates an average log-likelihood L1 of the removed cluster, and an average log-likelihood L2 of the (N−1) clusters, which are used to calculate the feature distribution (2) Calculates the difference (L1−L2) of the average log-likelihoods L1 and L2 as an average log-likelihood ratio LR.

Additionally, the server 20A repeats the estimation task and calculation task while changing, among the N clusters, a cluster to be removed, thus calculating N average log-likelihood ratios LR. Then, the server 20A averages the N average log-likelihood ratios LR to correspondingly calculate the sample sufficiency level SS.

After completion of calculation of the sample sufficiency level SS for each travelling segment, the server 20A stores, into the field "sample sufficiency level" of a record corresponding to each travelling segment in the travelling segment DB 25, the corresponding one of the calculated sample sufficiency levels SS. This updates the field "sample sufficiency level" of the record for each traveling segment from the initial value NULL to the corresponding one of the calculated sample sufficiency levels SS.

In step S55, upon determination that the sampled number of driving-state data items for each of all the travelling segments is sufficient (YES in step S55), the feature distribution storing routine proceeds to step S65.

Similar to the operation in step S50, the server 20A performs the feature distribution estimation routine to estimate, for each of the travelling segments, a current feature distribution of all of the driving-state data items allocated with a corresponding one of the travelling segments. In addition to the feature distribution estimation routine, the server 20A calculates the average log-likelihood SL using the driving-state data items for each travelling segment.

Note that, as described later, the server 20A estimates the feature distribution for each travelling segment using the driving-state data items for the corresponding travelling segment, and can calculate the average log-likelihood SL based on all or some of the driving-state data items used for estimating the feature distribution. The server 20A can also divide the driving-state data items for each travelling segment into a first group of driving-state data items used to estimate the feature distribution and a second group of driving-state data items used to calculate the average log-likelihood SL. In this case, a designer of the server 20A can determine the number of driving-state data items included in the second group or the ratio of the number of driving-state data items in the second group to the number of driving-state data items in the first group.

Each travelling segment whose sampled number of driving-state data items is determined to be sufficient will be referred to as a sufficient travelling segment.

Specifically, in step S65, the server 20A estimates, for each sufficient travelling segment, a feature distribution of the driving-state data items for the corresponding sufficient travelling segment. In addition, in step S65, the server 20A calculates, for each sufficient travelling segment, the average log-likelihood SL of the driving-state data items for the corresponding sufficient travelling segment.

Thereafter, the server 20A stores (1) The estimated feature distribution for each sufficient travelling segment into the field "current feature distribution" or each of the field "current feature distribution" and the field "definition-time distribution" of the record corresponding to the sufficient travelling segment in the travelling segment DB 25

(2) The calculated average log-likelihood SL for each sufficient travelling segment into the field "average log-likelihood" of the record corresponding to the sufficient travelling segment in the travelling segment DB 25

In step S55, upon determination that the sampled number of driving-state data items for each of all the travelling segments is sufficient (YES in step S55), the feature distribution storing routine, which has proceeded to step S65, proceeds to step S75.

In step S75, as in the operation in step S60, the server 20A performs the similarity calculation routine to 1. Calculate the similarity Sb between the current feature distribution and the definition-time distribution in each sufficient traveling segment 2. Calculate the similarity Sa between the current feature distribution in each sufficient traveling segment and the current feature distribution of the adjacent travelling segment in the forward direction 3. Store the calculated similarity Sb and similarity Sa for each sufficient traveling segment into the similarity DB 30.

The details of the similarity calculation routine in step S75 will be described later.

In step S55, upon determination that the sampled number of driving-state data items for at least one travelling segment is insufficient (NO in step S55), the server 20A updates the flag Fs of the travelling segment ID corresponding to the travelling segment determined to be insufficient from False to True in step S75; the travelling segment determined to be insufficient will be referred to as an insufficient travelling segment.

Then, in step S75, the server 20A performs the similarity calculation routine to calculate a similarity Sc of the insufficient travelling segment with respect to the current feature distributions of respective plural sufficient travelling segments, thus storing the similarity Sc into the similarity DB 30. The details of the similarity calculation routine in step S75 will be described later.

Next, similar to the operation in step S70, the server 20A performs, in step S85, the travelling segment division routine to 1. Determine whether to divide at least one sufficient travelling segment in all the sufficient travelling segments according to the similarity Sb for each sufficient travelling segment 2. Divide the at least one sufficient travelling segment when determining to divide the at least one sufficient travelling segment For the insufficient travelling segments, the server 20A determines no need to divide each of the insufficient travelling segments.

In step S95, the server 20A performs the travelling segment combination routine to 1. Determine whether to combine, i.e. integrate, at least one sufficient travelling segment pair in all the sufficient travelling segments according to the similarity Sa for each sufficient travelling segment calculated in step S75

2. Combine the at least one sufficient travelling segment pair to generate a single travelling segment when determining to combine the at least one sufficient travelling segment pair 3. Combine, based on the similarity Sc of the insufficient travelling segment, the insufficient travelling segment with a sufficient travelling segment that is similar to the insufficient travelling segment to define a travelling segment The details of the travelling segment combination routine will be described later.

In step S105, similar to the operation in step S90, the server 20A determines, in step S105, whether at least one travelling segment has been divided or has been combined with another travelling segment in the current cycle of the feature distribution storing routine. When it is determined that no travelling segments have been divided or combined with another travelling segment in the current cycle of the feature distribution storing routine (NO in step S90), the server 20A terminates the feature distribution storing routine.

Otherwise, when it is determined that at least one travelling segment has been divided in the current cycle of the feature distribution storing routine (YES in step S105), the server 20A performs the travelling segment reallocation routine in step S115. The travelling segment reallocation routine reallocates one of the divided travelling segments to each of the driving-state data items in the at least one travelling segment before division.

Otherwise, when it is determined that at least one travelling segment have been combined with another travelling segment in the current cycle of the feature distribution storing routine, the server 20A reallocates the combined travelling segment to each of the driving-state data items in the at least one travelling segment.

After completion of the operation in step S115, the server 20A returns to step S65, and performs the feature distribution estimation routine to store, for each travelling segment, the estimated feature distribution and the average log-likelihood SL into the travelling segment DB 25 (see step S65).

Next, the server 20A performs, in step S75, the similarity calculation routine to 1. Calculate the similarity Sb between the current feature distribution and the definition-time distribution in each reallocated traveling segment 2. Calculate the similarity Sa between the current feature distribution in each reallocated traveling segment and the current feature distribution of the adjacent reallocated travelling segment in the forward direction 3. Store the calculated similarity Sb and similarity Sa for each reallocated traveling segment into the similarity DB 30.

That is, the server 20A repeatedly performs the sequence of the operations in steps S65 to S115 until the determination in step S105 is NO. For example, when it is determined that no travelling segments are divided and are combined with another travelling segment at a k-th repetition (k is an integer equal to or more than 1) of the sequence (NO in step S105), the server 20A terminates the feature distribution storing routine.

The feature distribution storing routine enables an insufficient travelling segment to be combined with a sufficient travelling segment whose feature distribution of driving-state data items is similar to the driving-state data items of the insufficient travelling segment. This enables the travelling segment DB 25 in which a travelling segment, whose sampled number of driving-state data items is small, to be correlated with a feature distribution with higher accuracy. Note that, if there are no sufficient travelling segments whose feature distributions are dissimilar to the driving-state data items of the insufficient segment, the server 20A can wait for feature-distribution estimation until the sampled number of the driving-state data items of the insufficient travelling segment becomes a sufficient number.

In the second embodiment, the travelling segment allocation routine, the feature distribution estimation routine, the travelling segment division routine, and the travelling segment reallocation routine are respectively identical to the corresponding routines according to the first embodiment. For this reason, the descriptions of the travelling segment allocation routine, the feature distribution estimation routine, the travelling segment division routine, and the travelling segment reallocation routine are omitted in the second embodiment. That is, the following describes the details of the similarity calculation routine and the travelling segment combination routine.

Similarity Calculation Routine

The following describes the similarity calculation routine carried out by the server 20A in step S75 with reference to the flowchart of FIG. 28. The similarity calculator 28A of the server 20A performs the similarity calculation routine.

In step S315, the similarity calculator 28A determines whether False has been stored in each of the fields "Fs" of all the records corresponding to all the travelling segment IDs in the travelling segment DB 25.

When it is determined that False has been stored in each of the fields "Fs" of all the records corresponding to all the travelling segment IDs (YES in step S315), the similarity calculator 28A terminates the similarity calculation routine.

Otherwise, when it is determined that True has been stored in the field "Fs" of the record corresponding to travelling segment ID (NO in step S315), the similarity calculator 28A extracts, from the corresponding record, a value i, which is the value of the corresponding travelling segment ID in step S325.

In step S325, the similarity calculator 28A determines, for each travelling segment, whether the sampled number of driving-state data items corresponding to the travelling segment is sufficient.

Upon determination that the sampled number of driving-state data times for each of all the travelling segments is sufficient (YES in step S55), the similarity calculator 28A determines that the sampled number of driving-state data items for each travelling segment is sufficient in step S325. Then, the similarity calculation routine proceeds to step S335.

Then, the similarity calculator 28A performs the operations in steps S335, S345, and S355, which are respectively identical to the operations in steps S320, S330, and S340 illustrated in FIG. 12. After completion of the operation in step S355, the similarity calculation routine proceeds to step S385.

Otherwise, upon determination that the sampled number of driving-state data items for at least one travelling segment is insufficient (NO in step S55), the similarity calculator 28A determines that the sampled number of driving-state data items for the at least one travelling segment is insufficient in step S325. Then, the similarity calculation routine proceeds to step S365.

In step S365, the similarity calculator 28A calculates an average log-likelihood SM of driving-state data items for at least one insufficient travelling segment with respect to the current feature distributions for the sufficient travelling segments.

Next, the following describes an example of such an average log-likelihood SM with reference to FIG. 29.

FIG. 29 illustrates, in a case where the sampled number of driving-state data items di corresponding to a travelling segment (IDi) is insufficient, how average log-likelihoods SM (di, Pj), SM (di, Pj+1), and SM (di, Pj+2) are calculated. The average log-likelihood SM (di, Pj) shows an average log-likelihood of the driving-state data items di with respect to the current feature distribution Pj for the travelling segment (IDj). The average log-likelihood SM (di, Pj+1) shows an average log-likelihood of the driving-state data items di with respect to the current feature distribution Pj+1 for the travelling segment (IDj+1). The average log-likelihood SM (di, Pj+2) shows an average log-likelihood of the driving-state data items di with respect to the current feature distribution Pj+2 for the travelling segment (IDj+2).

As the current feature distributions of targets for calculation of such average log-likelihoods SM, the current feature distributions of all the respective sufficient travelling segments stored in the travelling segment DB 25 can be used. As the current feature distributions of targets for calculation of such average log-likelihoods SM, the current feature distributions of limited sufficient travelling segments stored in the travelling segment DB 25 can be used in order to reduce the calculation load of the server 20A.

For example, as the current feature distributions of targets for calculation of such average log-likelihoods SM, the current feature distributions of limited sufficient travelling segments stored in the travelling segment DB 25 can be used; the limited sufficient travelling segments are located in the same state or region as the state or region of the insufficient travelling segment. As another example, as the current feature distributions of targets for calculation of such average log-likelihoods SM, the current feature distributions of limited sufficient travelling segments stored in the travelling segment DB 25 can be used; the limited sufficient travelling segments each have the same road attribute as the road attribute of the insufficient road segment.

Such an average log-likelihoods SM can be calculated in accordance with the following equation (3):

$$SM(d_i, P_j) = \frac{1}{N} \sum_{n=1}^{N_i} \log P_j(d_i^{(n)}) \quad (3)$$

Where $N_i$ represents the sampled number of driving-state data items di. That is, similar to the average log-likelihood SL, the average log-likelihood SM (di, Pj) is obtained by (1) Calculating a log-likelihood of each of $N_i$ driving-state data items di corresponding to the current distribution Pj (2) Average the calculated Ni log-likelihoods Next, in step S375, the similarity calculator 28A calculates the similarities Sc (di, Pj), Sc(di, Pj+1), and Sc(di, Pj+2) based on the respective average log-likelihoods SM (di, Pj), SM (di, Pj+1), and SM (di, Pj+2) in accordance with the following equation (4):

$$Sc(d_i, P_j) = SM(d_i, P_j) - SL_j \qquad (4)$$

Where the average log-likelihood $SL_j$ is the average log-likelihood SL of the current feature distribution Pj calculated by the cross validation. The higher a value of the average log-likelihood SL is with the corresponding current distribution being narrower, the higher the corresponding value of the average log-likelihood SM is likely to be. In addition, the lower a value of the average log-likelihood SL is with the corresponding current distribution being wider, the lower the corresponding value of the average log-likelihood SM is likely to be.

Thus, as expressed in the equation (4), the similarity calculator 28A is configured not to directly set the average log-likelihood SM as the similarity Sc, but to calculate the deviation of the average log-likelihood SL from the average log-likelihood SM, thus obtaining the deviation as the similarity Sc.

That is, the similarity calculator 28A uses the average log-likelihoods SLj, SLj+1, and SLj+2 as the references of the respective similarities Sc (di, Pj), Sc (di, Pj+1), and Sc (di, Pj+2) relative to the corresponding current feature distributions Pj, Pj+1, and Pj+2. This enables the similarity calculator 28A calculate the similarities Sc (di, Pj), Sc (di, Pj+1), and Sc (di, Pj+2), which correspond to the respective current feature distributions Pj, Pj+l, and Pj+2, in dependence upon the differences in shape of the current feature distributions Pj, Pj+1, and Pj+2.

Next, in step S375, the similarity calculator 28A stores, into the similarity DB 30, the calculated similarities Sc (di, Pj), Sc (di, Pj+1), and Sc (di, Pj+2) which are correlated with the respective corresponding travelling-segment pairs (i, j), (i, j+1), and (i, j+2). Thereafter, the similarity calculation routine proceeds to step S385.

In step S385, the similarity calculator 28A performs the operation that is identical to the operation in step S350.

The above similarity calculation routine makes it possible to construct the similarity DB 30 in which the similarities Sa and Sb or the similarity Sc for each of the travelling segments ID has been stored.

Travelling Segment Combination Routine

The following describes the travelling segment combination routine carried out by the server 20A in step S95 with reference to the flowchart of FIG. 30. The segment changer 29A of the server 20A performs the travelling segment combination routine.

In step S515, the segment changer 29A performs the operation that is identical to the operation in step S510 to thereby determine whether all pairs of travelling segments, which have not been divided in above step S85, have been checked about their probability of combination in the travelling segment DB 25.

When it is determined that all pairs of travelling segments, which have not been divided in above step S85, have been checked about their probability of combination in the travelling segment DB 25 (YES in step S515), the segment changer 29A terminates the segment combination routine.

Otherwise, when it is determined that a pair of travelling segments, i.e. a travelling segment pair, which have not been divided in above step S85, have not been checked about their probability of combination in the travelling segment DB 25 (NO in step S515), the segment changer 29A extracts a pair (i, j), i.e. a travelling-segment ID pair (i, j), of the travelling segment pair. Then, the travelling segment combination routine proceeds to step S525. Note that, as described above, a travelling segment pair extracted in step S515 according to the second embodiment is comprised of a travelling segment having a travelling segment ID of i and a travelling segment, which is adjacent to the travelling segment with the travelling segment ID of i, having a travelling segment ID of j.

In step S525, the segment changer 29A determines, for each of the extracted travelling segments (IDi) and (IDj), whether the sampled number of driving-state data items corresponding to a corresponding one of the travelling segments is sufficient.

Upon determination that the sampled number of driving-state data times for each of the travelling segments (IDi) and (IDj) is sufficient (YES in step S55), the segment changer 29A determines that the sampled number of driving-state data items for each of the travelling segments (IDi) and (IDj) is sufficient in step S525. Then, the travelling segment combination routine proceeds to step S535.

Then, the segment changer 29A performs the operations in steps S535 and S545, which are respectively identical to the operations in steps S520 and S530 illustrated in FIG. 17. After completion of the operation in step S545, the travelling segment combination routine proceeds to step S385.

Otherwise, upon determination that the sampled number of driving-state data times for at least one of the travelling segments (IDi) and (IDj) is insufficient (NO in step S55), the segment changer 29A determines that the sampled number of driving-state data times for at least one of the travelling segments (IDi) and (IDj) is insufficient in step S525. Then, the travelling segment combination routine proceeds to step S555.

In step S555, the segment changer 29A determines whether the similarity Sc(di, Pj) of the travelling-segment ID pair (i, j is lower than a predetermined combination threshold Sthc. The combination threshold Sthc can be set to be identical to or different from the combination threshold Stha. Setting the combination threshold Sthc to be different from the combination threshold Stha enables, even if the first method for calculating the similarity Sc(di, Pj) is different from the second method for calculating the Sa(di, Pj), combination of a travelling-segment pair using a corresponding one of the first and second calculating methods to be carried out.

Upon determination that the similarity Sc(di, Pj) of the travelling-segment ID pair (i, j) is lower than the combination threshold Sthc (YES in step S555), the segment changer 29A determines that it is difficult to combine the travelling-segment pair corresponding to the travelling-segment ID pair (i, j) with each other, returning to step S515.

Otherwise, upon determination that the similarity Sc(di, Pj) of the travelling-segment ID pair (i, J is equal to or higher than the combination threshold Sthc (NO in step S555), the segment changer 29A determines that it is possible to combine the travelling-segment pair corresponding to the travelling-segment ID pair (i, j) with each other. Then, the travelling segment combination routine proceeds to step S565.

In step S565, similar to the operation in step S540, the segment changer 29A combines the ranges of the travelling-segment ID pair (i, j) with each other to define a new travelling segment. Then, in step S575, similar to the operation in step S560, the segment changer 29A deletes, from the travelling segment DB 25, information about the travelling-segment ID pair (i, j), i.e. the corresponding records for the respective travelling segment IDi and travelling segment IDj.

The above travelling segment combination routine therefore makes it possible to construct the travelling-segment DB 25 in which information corresponding to the combined travelling segment has been stored in the record of the integrated travelling segment.

Advantageous Effects

The second embodiment described above achieves the following advantageous effects in addition to the first to eighth advantageous effects.

Specifically, if the sampled number of the driving-state data items for a travelling segment is insufficient so that the travelling segment is determined as an insufficient segment, the server 20A calculates the likelihoods of driving-state data items included in the insufficient travelling segment with respect to the current feature distribution of each of selected sufficient travelling segments. Then, the server 20A calculates an average of the likelihoods of the riving-state data items included in the insufficient travelling segment with respect to the current feature distribution of each of the selected sufficient travelling segments, thus calculating a similarity Sc of the insufficient travelling segment with respect to the current feature distribution of each of the selected sufficient travelling segments.

Thereafter, upon determination that the similarity Sc of the insufficient travelling segment with respect to the current feature distribution of one of the sufficient travelling segments is higher than the combination threshold, the server 20A combines the sufficient travelling segment with the insufficient travelling segment. This configuration enables an insufficient travelling segment whose sampled number of driving-state data items is insufficient to be correlated with a feature distribution having high estimation accuracy.

The likelihoods of values of driving-state data items with respect to a current feature distribution may be changed depending on change of the shape of the current distribution. From this viewpoint, the server 20A uses, for each of selected sufficient travelling segments, the average log-likelihood SM corresponding to the selected sufficient travelling segment as the reference of the respective similarities Sc of the insufficient travelling segment with respect to the current feature distributions of the selected travelling segments.

This configuration enables the similarity Sc of the insufficient travelling segment with respect to the current feature distribution of a selected travelling segment to be calculated based on the difference between the corresponding reference and the likelihood of each driving-state data item included in the insufficient travelling segment with respect to the current feature distribution of the selected travelling segment. This enables the similarities Sc of the insufficient travelling segment with respect to the current feature distribution of each selected current feature distribution to be calculated in dependence upon the differences in shape of the selected current feature distributions.

Modifications

The first and second embodiments of the present invention have been described, but the present invention is not limited to the above embodiments, and can be variably modified.

Each of the first and second embodiments uses values measured by various in-vehicle sensors as driving-state data items, but the present invention is not limited thereto. Specifically, the present invention can use driving topic proportions, which are disclosed in Japanese Patent Application Publication No. 2014-235605, as the driving-state data items. The disclosure of Japanese Patent Application Publication No. 2014-235605 is incorporated entirely herein by reference.

The driving topic proportions each represent a composite proportion, i.e. a percentage, of driving topics estimated from driving behaviors, images in front of a vehicle, and a distribution of tags manually given to driving situations. Using the driving topic proportions as the driving-state data items enables the accuracy of the feature distribution to be further improved.

Another travelling-segment definition method for clustering collected driving-state data items into clusters using k-means or another method and defining a section in which driving-state data items included in the same cluster are continued as a travelling segment can be used as the method for defining travelling segments.

Each of the first and second embodiments is configured to combine two adjacent travelling segments, whose current distributions have a high similarity Sa, with each other, but can combine two non-adjacent travelling segments, whose current distributions are similar to each other, with one another.

Specifically, it is possible to assign a single travelling segment ID to a plurality of discrete ranges. In this case, it is necessary to calculate the similarities between non-adjacent travelling segments in addition to the similarities between adjacent travelling segments. If the similarities Sa between all pairs of travelling segments are calculated, the processing load of the server 20 may become greater. Thus, it is possible to calculate the similarities Sa between pairs of travelling segments within a predetermined region, such as an express way or an urban road.

Any value that can represent the similarity of corresponding two distributions except for the sigmoid function value of known Kullback-Leibler information can be used as each of the similarities Sa and Sb. For example, a sigmoid function value of Euclidean distance between representative values of their two feature distributions can be used as each of the similarities Sa and Sb.

The functions of one element in each of the first and second embodiments can be distributed as plural elements, and the functions that plural elements have can be combined into one element. At least part of the structure of each of the first and second embodiments can be replaced with a known structure having the same function as the at least part of the structure of the corresponding embodiment. A part of the structure of each of the first and second embodiments can be eliminated. At least part of the structure of each of the first and second embodiments can be added to or replaced with the structures of the other embodiment. All aspects included in the technological ideas specified by the language employed by the claims constitute embodiments of the present invention.

The present disclosure can be implemented by various embodiments in addition to the driving-state data storage apparatus; the various embodiments include systems each including the driving-state data storage apparatus, programs for serving a computer as the driving-state data storage apparatus, storage media, such as non-transitory storage media storing the programs, and methods of generating a driving-state data storage apparatus.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A driving-state data storage apparatus comprising:
a collector configured to collect, from each of a plurality of vehicles on a target travelling road, a value of data indicative of a driving state of the corresponding vehicle to correspondingly obtain driving-state data values for the target travelling road;
a data allocator configured to perform an allocation task to:
divide, based on similarity among the driving-state data values, the target travelling road into a plurality of travelling segments;
extract, from the driving-state data values, a subset of data values for each of the divided travelling segments, the data values extracted for each of the travelling segments being similar to each other;
determine, for each travelling segment, a data distribution based at least in part on the subset of data values associated with the respective travelling segment; and
allocate, to each travelling segment, the data distribution determined based at least in part on the subset associated with the respective travelling segment as a feature distribution; and
a storage unit configured to store the feature distribution allocated for each of the travelling segments, wherein the feature distributions are configured to assist control operations of an assisted vehicle such that the control operations respond to the feature distributions based at least in part on the data distribution associated with the respective travelling segment,
wherein:
the travelling segments include a first travelling segment and a second travelling segment;
the data allocator is configured to perform:
a first task to:
extract, from the driving-state data values, a first subset of data values that correspond to the first travelling segment and are similar to each other; and
allocate a distribution of the first subset of data values to the first travelling segment as a first feature distribution; and
a second task to:
extract, from the driving-state data values, a second subset of data values that correspond to the second travelling segment and are similar to each other; and
allocate a distribution of the second subset of data values to the second travelling segment as a second feature distribution;
the data allocator further comprising:
a similarity calculator configured to calculate a similarity between the first feature distribution and the second feature distribution; and
an integrator configured to:
determine whether the calculated similarity is equal to or more than a combination threshold; and
combine the first travelling segment and the second travelling segment to a single combined travelling segment upon determination that the calculated similarity is equal to or more than the combination threshold, and
wherein:
the collector is configured to store the driving-state data values for the target travelling road to be correlated with corresponding data collection positions;
the data allocator is configured to extract, from the driving-state data values, the subset of data values for each of the divided travelling segments in accordance with the collection positions of the driving-state data values, the data values extracted for each of the travelling segments being similar to each other,
the data allocator further comprising a determiner configured to:
calculate, for each of the travelling segments, a number of data values in the subset of data values that are similar to each other as a sampled number;
determine whether the sampled number calculated for each of the travelling segments is sufficient for the similarity calculator to calculate the similarity; and
separate the travelling segments into an insufficient travelling segment and a sufficient travelling segment, the sampled number calculated for the insufficient travelling segment being determined to be insufficient, the sampled number calculated for the sufficient travelling segment being determined to be sufficient;
the similarity calculator is configured to perform:
a task to obtain a sufficient travelling-segment feature distribution as a distribution of the subset of data values allocated for the sufficient travelling segment;
a task to calculate a likelihood of each of the subset of data values allocated for the insufficient travelling segment with respect to the sufficient travelling-segment feature distribution; and
a task to calculate, based on the likelihood calculated for each of the subset of data values allocated for the insufficient travelling segment, a data similarity for a corresponding one of the subset of data values allocated for the insufficient travelling segment with respect to the sufficient travelling-segment feature distribution; and
the integrator is configured to:
determine whether the data similarity for each of the subset of data values allocated for the insufficient travelling segment with respect to the sufficient travelling-segment feature distribution is equal to or more than a second combination threshold; and
combine the sufficient travelling segment and the insufficient travelling segment to define a single combination travelling segment upon determination that the data similarity for each of the subset of data values allocated for the insufficient travelling segment with respect to the sufficient travelling-segment feature distribution is equal to or more than the second combination threshold.

2. The driving-state data storage apparatus according to claim 1, wherein:
the sufficient travelling segment comprises a first sufficient travelling segment and a second sufficient travelling segment;
the similarity calculator is configured to perform:
a task to obtain a first sufficient travelling-segment feature distribution as a distribution of the subset of data values allocated for the first sufficient travelling segment, and a second sufficient travelling-segment feature distribution as a distribution of the subset of data values allocated for the second sufficient travelling segment;
a task to calculate a first likelihood of each of the subset of data values allocated for the insufficient travelling segment with respect to the first sufficient travelling-segment feature distribution, and a second likelihood of each of the subset of data values allocated for the insufficient travelling segment with respect to the second sufficient travelling-segment feature distribution; and
a task to:
calculate, based on a first difference between a first reference and the first likelihood of each of the subset of data values allocated for the insufficient travelling segment, a first data similarity for the corresponding data value in the subset of data values allocated for the insufficient travelling segment with respect to the first sufficient travelling-segment feature distribution, the first reference being based on the first sufficient travelling-segment feature distribution; and
calculate, based on a second difference between a second reference and the second likelihood of each of the subset of data values allocated for the insufficient travelling segment, a second data similarity for the corresponding data value in the subset of data values allocated for the insufficient travelling segment with respect to the second sufficient travelling-segment feature distribution, the second reference being based on the second sufficient travelling-segment feature distribution.

3. The driving-state data storage apparatus according to claim 1, wherein:
the first and second travelling segments are adjacent to each other in the target travelling road.

4. The driving-state data storage apparatus according to claim 1, wherein:
the collector is configured to repeatedly collect, from each of the plurality of vehicles, the driving-state data values for the target travelling road; and
the data allocator is configured to perform the allocation task at least two times in accordance with an increase of the number of driving-state data values collected by the collector,
the first allocation task allocating a first feature distribution that is the feature distribution to each of the travelling segments,
the second allocation task allocating a second feature distribution that is the feature distribution to each of the travelling segments;
the data allocator further comprising:
a divider configured to divide a target travelling segment selected in the travelling segments into a first division travelling segment and a second division travelling segment in accordance with change of a shape of the second feature distribution for the target travelling segment with respect to the first feature distribution for the target travelling segment.

5. The driving-state data storage apparatus according to claim 4, wherein:
the data allocator comprises a similarity calculator configured to calculate a similarity between the first feature distribution and the second feature distribution; and
the divider is configured to:
determine whether the calculated similarity is less than a predetermined division threshold; and
divide the target travelling segment into the first and second division travelling segments when the calculated similarity is less than the predetermined division threshold.

6. The driving-state data storage apparatus according to claim 3, wherein:
the travelling segments include, in addition to the first and second travelling segments, a third travelling segment adjacent to the second travelling segment, the first and second travelling segments constituting a first travelling-segment pair, the second and third travelling segments constituting a second travelling-segment pair;
the data allocator is configured to perform, in addition to the first and second tasks, a third task to:
extract, from the driving-state data values, a subset of data values that correspond to the third travelling segment and are similar to each other as third data values; and
allocate a data distribution of the third data values to the third travelling segment as a third feature distribution;
the similarity calculator is configured to:
calculate the similarity between the first feature distribution and the second feature distribution as a first similarity; and
calculate a similarity between the second feature distribution and the third feature distribution as a second similarity; and
the integrator is configured to:
determine whether each of the first and second similarities is equal to or more than the combination threshold; and
combine a selected one of the first and second travelling-segment pair with one another upon determination that each of the first and second similarities is equal to or more than the combination threshold,
the selected one of the first and second travelling-segment pair corresponding to one of the first similarity and the second similarity that is higher than the other of the first similarity and the second similarity.

7. The driving-state data storage apparatus according to claim 5, further comprising:
a database configured to store the driving-state data values for the target travelling road repeatedly collected from the plurality of vehicles by the collector such that the driving-state data values are respectively correlated with corresponding data collection positions;
the data allocator is configured to:
extract, from the driving-state data values stored in the database, the subset of data values for each of the first and second travelling segments divided by the divider in accordance with the collection positions of the respective driving-state data values, the data values extracted for each of the first and second travelling segments being similar to one another; and allocate a data distribution of the extracted subset of data values for each of the first and second travelling segments to the corresponding one of the first and second travelling segments as a reallocation feature distribution.

8. The driving-state data storage apparatus according to claim 1, wherein:

the data allocator is configured to divide the target travelling road based on map information about the target travelling road to correspondingly define the plurality of travelling segments.

9. A course estimator, comprising:

one or more non-transitory computer-readable storage media; and one or more processors configured to at least:

collect, from each of a plurality of vehicles on a target travelling road, a value of data indicative of a driving state of the corresponding vehicle to correspondingly obtain driving-state data values for the target travelling road;

perform an allocation task to:

divide, based on similarity among the driving-state data values, the target travelling road into a plurality of travelling segments;

extract, from the driving-state data values, a subset of data values for each of the divided travelling segments, the data values extracted for each of the travelling segments being similar to each other;

determine, for each travelling segment, a data distribution based at least in part on the subset of data values associated with the respective travelling segment; and allocate, to each travelling segment, the data distribution determined based at least in part on the subset associated with the respective travelling segment as a feature distribution; and store the feature distribution allocated for each of the travelling segments, wherein the feature distributions are configured to assist control operations of an assisted vehicle, wherein:

the travelling segments include a first travelling segment and a second travelling segment;

the one or more processors is configured to perform:

a first task to:

extract, from the driving-state data values, a first subset of data values that correspond to the first travelling segment and are similar to each other; and allocate a distribution of the first subset of data values to the first travelling segment as a first feature distribution; and a second task to:

extract, from the driving-state data values, a second subset of data values that correspond to the second travelling segment and are similar to each other; and allocate a distribution of the second subset of data values to the second travelling segment as a second feature distribution;

the one or more processors further configured to:

calculate a similarity between the first feature distribution and the second feature distribution; and determine whether the calculated similarity is equal to or more than a combination threshold; and combine the first travelling segment and the second travelling segment to a single combined travelling segment upon determination that the calculated similarity is equal to or more than the combination threshold, and wherein:

the one or more non-transitory computer-readable storage media is configured to store the driving-state data values for the target travelling road to be correlated with corresponding data collection positions;

the one or more processors is configured to extract, from the driving-state data values, the subset of data values for each of the divided travelling segments in accordance with the collection positions of the driving-state data values, the data values extracted for each of the travelling segments being similar to each other, the one or more processors further comprising a determiner configured to:

calculate, for each of the travelling segments, a number of data values in the subset of data values that are similar to each other as a sampled number;

determine whether the sampled number calculated for each of the travelling segments is sufficient to calculate the similarity; and separate the travelling segments into an insufficient travelling segment and a sufficient travelling segment, the sampled number calculated for the insufficient travelling segment being determined to be insufficient, the sampled number calculated for the sufficient travelling segment being determined to be sufficient;

the one or more processors is configured to perform:

a task to obtain a sufficient travelling-segment feature distribution as a distribution of the subset of data values allocated for the sufficient travelling segment;

a task to calculate a likelihood of each of the subset of data values allocated for the insufficient travelling segment with respect to the sufficient travelling-segment feature distribution; and a task to calculate, based on the likelihood calculated for each of the subset of data values allocated for the insufficient travelling segment, a data similarity for a corresponding one of the subset of data values allocated for the insufficient travelling segment with respect to the sufficient travelling-segment feature distribution; and the one or more processors is configured to:

determine whether the data similarity for each of the subset of data values allocated for the insufficient travelling segment with respect to the sufficient travelling-segment feature distribution is equal to or more than a second combination threshold; and combine the sufficient travelling segment and the insufficient travelling segment to define a single combination travelling segment upon determination that the data similarity for each of the subset of data values allocated for the insufficient travelling segment with respect to the sufficient travelling-segment feature distribution is equal to or more than the second combination threshold.

10. A computer-implemented method, comprising:

collecting, from each of a plurality of vehicles on a target travelling road, a value of data indicative of a driving state of the corresponding vehicle to correspondingly obtain driving-state data values for the target travelling road;

dividing, based on similarity among the driving-state data values, the target travelling road into a plurality of travelling segments;

extracting, from the driving-state data values, a subset of data values for each of the divided travelling segments, the data values extracted for each of the travelling segments being similar to each other;

determining, for each travelling segment, a data distribution based at least in part on the subset of data values associated with the respective travelling segment;

allocating, to each travelling segment, the data distribution determined based at least in part on the subset associated with the respective travelling segment as a feature distribution; and storing the feature distribution allocated for each of the travelling segments, wherein the feature distributions are configured to assist control operations of an assisted vehicle, wherein:

the travelling segments include a first travelling segment and a second travelling segment;

the method further comprising:

extracting, from the driving-state data values, a first subset of data values that correspond to the first travelling segment and are similar to each other;

allocating a distribution of the first subset of data values to the first travelling segment as a first feature distribution;

extracting, from the driving-state data values, a second subset of data values that correspond to the second travelling segment and are similar to each other;

allocating a distribution of the second subset of data values to the second travelling segment as a second feature distribution;

calculating a similarity between the first feature distribution and the second feature distribution, the method further comprising:

determining whether the calculated similarity is equal to or more than a combination threshold; and combining the first travelling segment and the second travelling segment to a single combined travelling segment upon determination that the calculated similarity is equal to or more than the combination threshold, the method further comprising:

storing the driving-state data values for the target travelling road to be correlated with corresponding data collection positions; and extracting, from the driving-state data values, the subset of data values for each of the divided travelling segments in accordance with the collection positions of the driving-state data values, the data values extracted for each of the travelling segments being similar to each other, the method further comprising:

calculating, for each of the travelling segments, a number of data values in the subset of data values that are similar to each other as a sampled number;

determining whether the sampled number calculated for each of the travelling segments is sufficient for the similarity calculator to calculate the similarity;

separating the travelling segments into an insufficient travelling segment and a sufficient travelling segment, the sampled number calculated for the insufficient travelling segment being determined to be insufficient, the sampled number calculated for the sufficient travelling segment being determined to be sufficient; and the method further comprising:

obtaining a sufficient travelling-segment feature distribution as a distribution of the subset of data values allocated for the sufficient travelling segment;

calculating a likelihood of each of the subset of data values allocated for the insufficient travelling segment with respect to the sufficient travelling-segment feature distribution; and calculating, based on the likelihood calculated for each of the subset of data values allocated for the insufficient travelling segment, a data similarity for a corresponding one of the subset of data values allocated for the insufficient travelling segment with respect to the sufficient travelling-segment feature distribution, the method further comprising:

determining whether the data similarity for each of the subset of data values allocated for the insufficient travelling segment with respect to the sufficient travelling-segment feature distribution is equal to or more than a second combination threshold; and combining the sufficient travelling segment and the insufficient travelling segment to define a single combination travelling segment upon determination that the data similarity for each of the subset of data values allocated for the insufficient travelling segment with respect to the sufficient travelling-segment feature distribution is equal to or more than the second combination threshold.

* * * * *